(12) United States Patent
Joshi

(10) Patent No.:  US 12,677,068 B2
(45) Date of Patent:        Jul. 7, 2026

(54) VIDEO FENCING SYSTEM AND METHOD

(71) Applicant: Shure Acquisition Holdings, Inc.,
Niles, IL (US)

(72) Inventor: Bijal Joshi, Elk Grove Village, IL (US)

(73) Assignee: Shure Acquisition Holdings, Inc.,
Niles, IL (US)

( * ) Notice: Subject to any disclaimer, the term of this
patent is extended or adjusted under 35
U.S.C. 154(b) by 48 days.

(21) Appl. No.: 18/764,834

(22) Filed: Jul. 5, 2024

(65) Prior Publication Data

US 2025/0016452 A1      Jan. 9, 2025

Related U.S. Application Data

(60) Provisional application No. 63/512,389, filed on Jul.
7, 2023.

(51) Int. Cl.
*H04N 23/69*            (2023.01)
(52) U.S. Cl.
CPC .................................. *H04N 23/69* (2023.01)
(58) Field of Classification Search
None
See application file for complete search history.

(56) References Cited

U.S. PATENT DOCUMENTS

| | | | |
|---|---|---|---|
| 5,206,721 | A | 4/1993 | Ashida |
| 5,686,957 | A | 11/1997 | Baker |
| 6,731,334 | B1 | 5/2004 | Maeng |

| | | | |
|---|---|---|---|
| 6,980,485 | B2 | 12/2005 | McCaskill |
| 7,305,095 | B2 | 12/2007 | Rui |
| 7,349,008 | B2 | 3/2008 | Rui |
| 7,403,217 | B2 | 7/2008 | Schulz |
| 7,487,056 | B2 | 2/2009 | Tashev |
| 7,586,513 | B2 | 9/2009 | Muren |
| 7,852,369 | B2 | 12/2010 | Cutler |

(Continued)

FOREIGN PATENT DOCUMENTS

| | | |
|---|---|---|
| CN | 102843540 | 12/2012 |
| CN | 107809596 | 3/2018 |

(Continued)

OTHER PUBLICATIONS

ATND1061DAN, Beamforming Array Microphone, User Manual,
Audio-technica, 2022, 107 pp.

(Continued)

*Primary Examiner* — Cynthia Calderon
(74) *Attorney, Agent, or Firm* — ALSTON & BIRD LLP

(57)                    ABSTRACT

Systems and methods are provided for receiving, from at
least one microphone, boundary information defining one or
more boundaries for an audio pick-up region; receiving,
from the at least one microphone, sound location informa-
tion indicating a detected sound position of an audio source
located within the audio pick-up region; identifying, based
on the sound location information and the boundary infor-
mation, a first boundary of the one or more boundaries as
being located near the detected sound position; calculating a
first distance between the detected sound position and the
first boundary; determining, based on the first distance, a
depth of field parameter for at least one camera; and pro-
viding the depth of field parameter and the sound location
information to the at least one camera.

21 Claims, 5 Drawing Sheets

400 ⇀

(56) References Cited

U.S. PATENT DOCUMENTS

| | | | |
|---|---|---|---|
| 8,189,807 B2 | 5/2012 | Cutler | |
| 8,238,573 B2 | 8/2012 | Ishibashi | |
| 8,248,448 B2 | 8/2012 | Feng | |
| 9,030,520 B2 | 5/2015 | Chu | |
| 9,179,098 B2 | 11/2015 | Buckler | |
| 9,338,549 B2 | 5/2016 | Haulick | |
| 9,350,940 B1 | 5/2016 | Baker | |
| 9,392,221 B2 | 7/2016 | Feng | |
| 9,489,948 B1 | 11/2016 | Chu | |
| 9,621,795 B1 | 4/2017 | Whyte | |
| 9,633,270 B1 | 4/2017 | Tangeland | |
| 9,674,453 B1 | 6/2017 | Tangeland | |
| 9,769,424 B2 | 9/2017 | Michot | |
| 9,769,552 B2 | 9/2017 | Choisel | |
| 9,980,040 B2 | 5/2018 | Whyte | |
| 10,091,412 B1 | 10/2018 | Feng | |
| 10,491,809 B2 | 11/2019 | Feng | |
| 10,582,117 B1 | 3/2020 | Tanaka | |
| 10,966,022 B1 | 3/2021 | Chu | |
| 11,127,401 B2 | 9/2021 | Sarkar | |
| 11,381,906 B2 | 7/2022 | Rollow, IV | |
| 11,438,691 B2 | 9/2022 | Veselinovic | |
| 11,601,731 B1 | 3/2023 | Slotznick | |
| 11,695,900 B2 | 7/2023 | Childress, Jr. | |
| 11,902,656 B2 | 2/2024 | Muthiah | |
| 12,143,806 B2 | 11/2024 | Mcelveen | |
| 2001/0024233 A1* | 9/2001 | Urisaka | H04N 23/661 |
| | | | 348/E7.086 |
| 2005/0008169 A1 | 1/2005 | Muren | |
| 2005/0140779 A1 | 6/2005 | Schulz | |
| 2005/0283328 A1 | 12/2005 | Tashev | |
| 2006/0005136 A1 | 1/2006 | Wallick | |
| 2006/0262942 A1 | 11/2006 | Oxford | |
| 2008/0037802 A1 | 2/2008 | Posa | |
| 2009/0323981 A1 | 12/2009 | Cutler | |
| 2011/0135125 A1 | 6/2011 | Zhan | |
| 2011/0285808 A1* | 11/2011 | Feng | H04N 7/142 |
| | | | 348/E7.083 |
| 2011/0285809 A1 | 11/2011 | Feng | |
| 2011/0317522 A1 | 12/2011 | Florencio | |
| 2012/0294118 A1 | 11/2012 | Haulick | |
| 2013/0271559 A1 | 10/2013 | Feng | |
| 2013/0300820 A1 | 11/2013 | Liu | |
| 2014/0362163 A1 | 12/2014 | Winterstein | |
| 2015/0146078 A1 | 5/2015 | Aarrestad | |
| 2015/0156578 A1 | 6/2015 | Alexandridis | |
| 2016/0277712 A1 | 9/2016 | Michot | |
| 2016/0351191 A1* | 12/2016 | Vilermo | G06F 3/167 |
| 2017/0201825 A1* | 7/2017 | Whyte | H04N 23/69 |
| 2018/0007486 A1* | 1/2018 | Cricri | G06F 3/011 |
| 2018/0167581 A1 | 6/2018 | Goesnar | |
| 2018/0270451 A1 | 9/2018 | Dickins | |
| 2019/0158733 A1 | 5/2019 | Feng | |
| 2020/0084366 A1 | 3/2020 | Fujiwara | |
| 2020/0322719 A1 | 10/2020 | Mccowan | |
| 2020/0351435 A1 | 11/2020 | Therkelsen | |
| 2021/0051397 A1 | 2/2021 | Veselinovic | |
| 2021/0097995 A1 | 4/2021 | Sarkar | |
| 2021/0152930 A1 | 5/2021 | Bryans | |
| 2021/0266680 A1 | 8/2021 | Frieding | |
| 2021/0345040 A1 | 11/2021 | Meyer | |
| 2021/0360193 A1 | 11/2021 | Childress, Jr. | |
| 2022/0201421 A1 | 6/2022 | Mcelveen | |
| 2022/0256098 A1* | 8/2022 | Uesaka | G06T 5/70 |
| 2022/0353465 A1 | 11/2022 | Smith | |
| 2023/0025997 A1 | 1/2023 | Liu | |
| 2023/0053202 A1 | 2/2023 | Chu | |
| 2023/0086490 A1 | 3/2023 | Abraham | |
| 2023/0216988 A1 | 7/2023 | Yan | |
| 2024/0007744 A1 | 1/2024 | Muthiah | |

FOREIGN PATENT DOCUMENTS

| | | |
|---|---|---|
| CN | 108063910 | 5/2018 |
| CN | 108370470 | 8/2018 |
| CN | 112311999 | 2/2021 |
| CN | 112689092 | 4/2021 |
| CN | 113099160 | 7/2021 |
| EP | 0765084 | 3/1997 |
| EP | 1705911 | 9/2006 |
| JP | H01180193 | 7/1989 |
| JP | H0314386 | 1/1991 |
| JP | H1042264 | 2/1998 |
| JP | 2000041228 | 2/2000 |
| JP | 3739673 | 1/2006 |
| JP | 2011193392 | 9/2011 |
| JP | 2020043456 | 3/2020 |
| KR | 101884446 | 8/2018 |
| KR | 102407872 | 6/2022 |
| WO | 2008047804 | 4/2008 |

OTHER PUBLICATIONS

AVer Press Release, "AVer Partners with Sennheiser to Transform Video and Audio Collaboration," Nov. 18, 2021, 1 p.

AVer PTZ Link, User Manual, AVer Information Inc., 2022, 71 pp.

HDL300 System, Nureva Product Page, Downloaded from webpage <https://www.nureva.com/audio-conferencing/hdl300> on Dec. 4, 2024, 10 pp.

Introducing StreamSet, Audio-technica, Product Page, Downloaded from webpage <https://www.audio-technica.com/en-us/> on May 15, 2023, 7 pp.

MXA920 Command Strings, Shure, User Manual, 2024, 41 pp.

Vissonic Audio Solutions, Array Microphone Conference Solution, Downloaded from <https://www.vissonic.com/solution/220.html> on Dec. 4, 2024, 7 pp.

Yealink, MeetingEye 800, 4K UHD Video Conferencing Endpoint, Information Sheet, 2022, 4 pp.

Aarabi, "The Fusion of Distributed Microphone Arrays for Sound Localization," EURASIP Journal on Applied Signal Processing, vol. 2003, No. 4, Jan. 2003, 10 pp.

Dibiase, et al., "Robust Localization in Reverberant Rooms," Microphone Arrays, 2001, 24 pp.

Dong, et al., "Research on TDOA based microphone array acoustic localization," IEEE 12th International Conference on Electronic Measurement & Instruments, 2015, 5 pp.

Gabriel, et al., "Design and assessment of multiple-sound source localization using microphone arrays," Proceedings of the 2019 IEEE/SICE Intl. Symposium on System Integration, Jan. 2019, 6 pp.

International Search Report and Written Opinion for PCT/US2022/076815 dated Jan. 5, 2023, 12 pp.

International Search Report and Written Opinion for PCT/US2023/026753 dated Sep. 15, 2023, 13 pp.

International Search Report and Written Opinion for PCT/US2023/030647 dated Nov. 9, 2023, 11 pp.

International Search Report and Written Opinion for PCT/US2024/036908 dated Nov. 13, 2024, 14 pp.

Ishi, et al., "Using multiple microphone arrays and reflections for 3D localization of sound sources," 2013 IEEE/RSJ International Conference on Intelligent Robots and Systems, 6 pp.

Ishi, et al., "Speech activity detection and face orientation estimation using multiple microphone arrays and human position information," IEEE/RSJ Intl. Conference on Intelligent Robots and Systems, 2015, 6 pp.

Kuhn, "Adaptive Audio/Video Zone Creation in Online Meeting Environment," ip.com, Jun. 22, 2022, 5 pp.

Lathoud, et al., "Short-Term Spatio-Temporal Clustering Applied to Multiple Moving Speakers," IEEE Transactions on Audio, Speech, and Language Processing, vol. 15, No. 5, Jul. 2007, 15 pp.

Legg, et al., "A Combined Microphone and Camera Calibration Technique with Application to Acoustic Imaging," IEEE Transactions on Image Processing, vol. 22, No. 10, pp. 4028-4039, Oct. 1, 2013, 12 pp.

(56) References Cited

OTHER PUBLICATIONS

Mitchell, "Poly Studio review: Take the pain out of videoconferencing," ITPro, Sep. 17, 2019, 9 pp.

Nishiura, et al., "Collaborative Steering of Microphone Array and Video Camera Toward Multi-lingual Tele-conference Through Speech-to-Speech Translation," IEEE Workshop on Automatic Speech Recognition and Understanding, 2001, 4 pp.

Ronzhin, et al., "Audiovisual Speaker Localization in Medium Smart Meeting Room," IEEE Icics 8th International Conference, Dec. 2011, 5 pp.

Sharma, "The Ultimate Guide to K-Means Clustering: Definition, Methods and Applications," Analytics Vidhya, Nov. 3, 2023, 19 pp.

Thiergart, et al., "Localization of Sound Sources in Reverberant Environments Based on Directional Audio Coding Parameters," Audio Engineering Society Convention 127, New York, Oct. 2009, 14 pp.

Wang, et al., "Voice Source Localization for Automatic Camera Pointing System in Videoconferencing," 1997 IEEE International Conference on Acoustics, Speech, and Signal Processing, vol. 1, 4 pp.

Webex Help Center, "Differences between the presenter and the audience, briefing room, and classroom setups," Downloaded from website <https://help.webex.com/en-us/article/n4522teb/Set-up-classroom-on-Room-Series> on Feb. 11, 2025, 15 pp.

* cited by examiner

300

VIDEO FENCING SYSTEM AND METHOD

CROSS-REFERENCE

This application claims priority to U.S. Provisional Pat. App. No. 63/512,389, filed on Jul. 7, 2023, the contents of which are incorporated herein in their entirety.

TECHNICAL FIELD

This disclosure generally relates to focusing a camera on an active talker and more specifically, to systems and methods for defining a visual boundary around the active talker based on talker location information and corresponding audio coverage area information provided by one or more microphones.

BACKGROUND

Various audio-visual environments, such as conference rooms, boardrooms, classrooms, video conferencing settings, performance venues, and more, typically involve the use of microphones (including microphone arrays) for capturing sound from one or more audio sources (e.g., human speakers) in the environment and one or more image capture devices (e.g., cameras) for capturing images and/or videos of the one or more audio sources or other persons and/or objects in the environment. The captured audio and video may be disseminated to a local audience in the environment through loudspeakers (for sound reinforcement) and display screens (for visual reinforcement), and/or transmitted to a remote location for listening and viewing a remote audience (such as via a telecast, webcast, or the like). For example, the transmitted audio and video may be used by persons in a conference room to conduct a conference call with other persons at the remote location.

One or more microphones may be used in order to optimally capture the speech and sound produced by the persons in the environment. Some existing audio systems ensure optimal audio coverage of a given environment by delineating "audio coverage areas," which represent the regions in the environment that are designated for capturing audio signals, such as, e.g., speech produced by human speakers. The audio coverage areas define the spaces where beamformed audio pick-up lobes can be deployed by the microphones, for example. A given environment or room can include one or more audio coverage areas, depending on the size, shape, and type of environment. For example, the audio coverage area for a typical conference room may include the seating areas around a conference table, while a typical classroom may include one coverage area around the blackboard and/or podium at the front of the room and another coverage area around the tables and chairs, or other audience area, facing the front of the room. Some audio systems have fixed audio coverage areas, while other audio system are configured to dynamically create audio coverage areas for a given environment.

Some existing camera systems are configured to point a camera in the direction of an active talker, such as a human in the environment that is speaking, singing, or otherwise making sounds, so that viewers, locally or remotely, can see who is talking. Some cameras use motion sensors and/or facial recognition software in order to guess which person is talking for camera tracking purposes. Some camera systems use multiple cameras to optimally capture persons located at different parts of the environment or otherwise capture video of the whole environment.

SUMMARY

The techniques of this disclosure provide systems and methods designed to, among other things: (1) use a microphone's audio coverage area to define one or more visual boundaries for video captured by a camera; (2) adjust one or more parameters of the camera based on talker location information and audio coverage area information provided by the microphone, so that the captured video focuses on an active talker and the surrounding audio coverage area; and (3) exclude, from the captured video, unwanted imagery from beyond the one or more visual boundaries.

One exemplary embodiment includes a method performed by one or more processors in communication with each of at least one microphone and at least one camera, the method comprising: receiving, from the at least one microphone, boundary information defining one or more boundaries for an audio pick-up region; receiving, from the at least one microphone, sound location information indicating a detected sound position of an audio source located within the audio pick-up region; identifying, based on the sound location information and the boundary information, a first boundary of the one or more boundaries as being located near the detected sound position; calculating a first distance between the detected sound position and the first boundary; determining, based on the first distance, a depth of field parameter for the at least one camera; and providing the depth of field parameter and the sound location information to the at least one camera.

Another exemplary embodiment includes a system comprising: at least one microphone configured to provide: boundary information defining one or more boundaries for an audio pick-up region, and sound location information indicating a detected sound position of an audio source located within the audio pick-up region; at least one camera configured to capture images of the audio pick-up region; and one or more processors communicatively coupled to each of the at least one microphone and the at least one camera, the one or more processors configured to: receive the boundary information and the sound location information from the at least one microphone; identify, based on the sound location information and the boundary information, a first boundary, of the one or more boundaries, that is located near the detected sound position; calculate a first distance between the detected sound position and the first boundary; determine, based on the first distance, a depth of field parameter for the at least one camera; and provide the depth of field parameter and the sound location information to the at least one camera.

Another exemplary embodiment includes a method performed by one or more processors in communication with: a first camera, a second camera, and at least one microphone, the method comprising: receiving, from the at least one microphone, boundary information defining one or more first boundaries for a first audio pick-up region, and one or more second boundaries for a second audio pick-up region; receiving, from the at least one microphone, sound location information indicating: a first detected sound position of a first audio source located within the first audio pick-up region, and a second detected sound position of a second audio source located within the second audio pick-up region; identifying, based on the boundary information, the first camera as being near the first audio pick-up region and the second camera as being near the second audio pick-up region; configuring the first camera to capture images or video of the first audio pick-up region, and the second camera to capture images or video of the second audio pick-up region; identifying, based on the sound location information and the boundary information, a first boundary of the one or more first boundaries as being located near the first detected sound position, and a second boundary of the one or more second boundaries as being located near the second detected sound position; calculating a first distance between the first detected sound position and the first boundary, and a second distance between the second detected sound position and the second boundary; determining, based on the first distance, a first depth of field parameter for the first camera; determining, based on the second distance, a second depth of field parameter for the second camera; providing the first detected sound position and the first depth of field parameter to the first camera; and providing the second detected sound position and the second depth of field parameter to the second camera.

Another exemplary embodiment includes a system comprising: a first camera; a second camera; at least one microphone configured to provide: boundary information for: a first audio pick-up region defined by one or more first boundaries, and a second audio pick-up region defined by one or more second boundaries; and sound location information indicating: a first detected sound position of a first audio source located within the first audio pick-up region, and a second detected sound position of a second audio source located within the second audio pick-up region; and one or more processors communicatively coupled to each of the first camera, the second camera, and the at least one microphone, the one or more processors configured to: receive the boundary information and the sound location information from the at least one microphone; identify, based on the boundary information, the first camera as being near the first audio pick-up region and the second camera as being near the second audio pick-up region; configure the first camera to capture images or video of the first audio pick-up region, and the second camera to capture images or video of the second audio pick-up region; identify, based on the sound location information and the boundary information, a first boundary of the one or more first boundaries as being located near the first detected sound position, and a second boundary of the one or more second boundaries as being located near the second detected sound position; calculate a first distance between the first detected sound position and the first boundary, and a second distance between the second detected sound position and the second boundary; determine, based on the first distance, a first depth of field parameter for the first camera; determine, based on the second distance, a second depth of field parameter for the second camera; provide the first detected sound position and the first depth of field parameter to the first camera; and provide the second detected sound position and the second depth of field parameter to the second camera.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
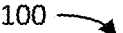
FIG. 1 is a schematic diagram of an exemplary environment comprising an audio-visual system configured to focus image capture on one or more audio sources within an audio coverage area and exclude unwanted imagery outside the audio coverage area, in accordance with one or more embodiments.
Figure 1:
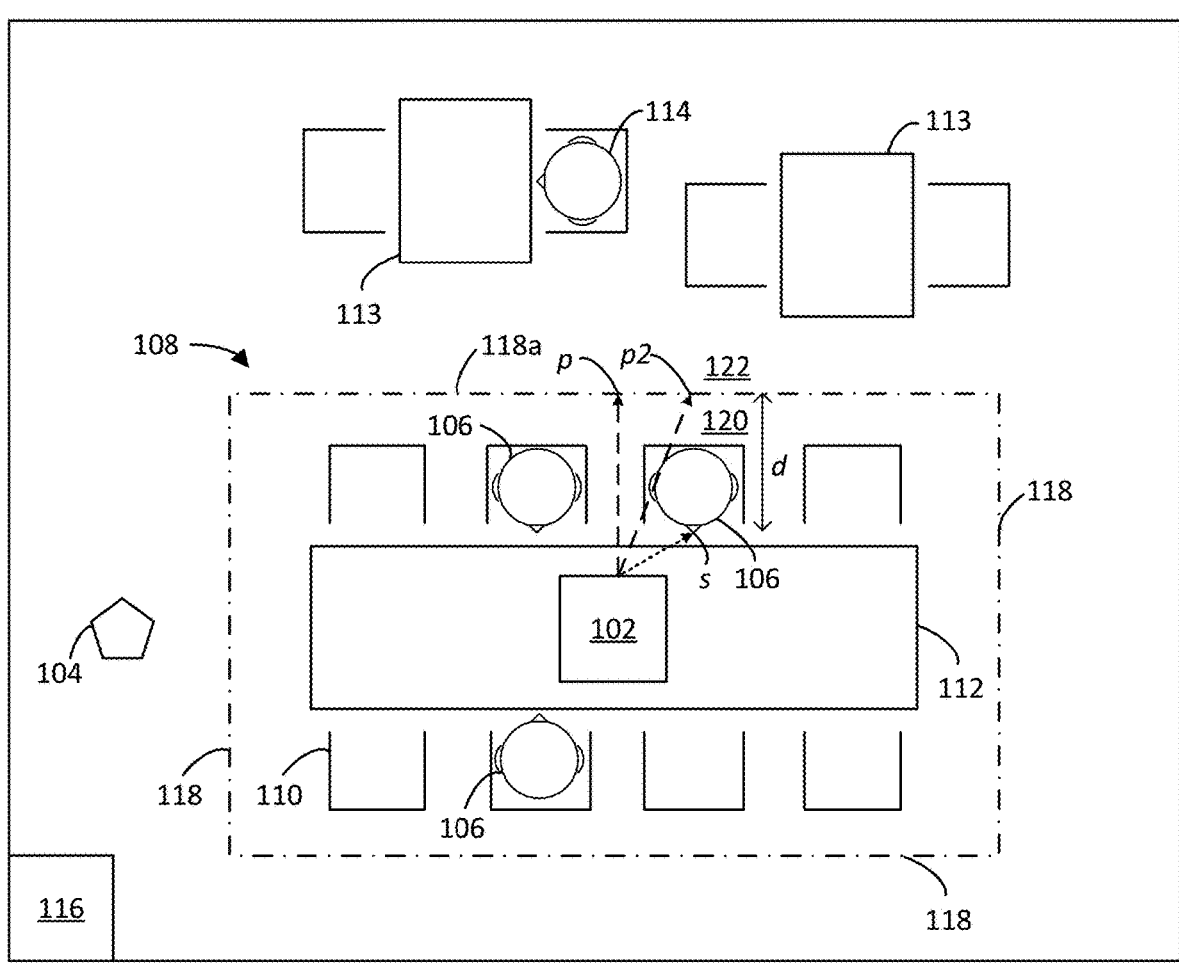

In general, audio systems can use audio coverage areas to focus one or more beamformed audio pick-up lobes on sounds produced by audio sources located within a pre-defined region, or acceptance zone, of a given environment (e.g., room), and the audio signals captured by the audio pick-up lobes can be provided to respective channels of an automixer to generate a desired audio mix. In some cases, audio systems may form an "audio fence" around one or more audio coverage areas in order to prevent or block unwanted sounds produced by audio sources located outside the audio coverage area(s) from entering a desired audio output (e.g., a mix of the audio signals captured inside the audio coverage area(s)). For example, the audio fence may be formed by muting any lobes that are deployed towards audio sources located outside the audio coverage area(s), so that audio signals captured outside the audio coverage area(s) are not included in the desired audio output.

In the hybrid work environment, meeting spaces and other workspaces that are shared by multiple individuals have become increasingly common and popular. Some shared workspaces have a common audio system and thus, can benefit from the use of audio fencing techniques and the like to help prevent a video call, teleconference, etc. from disturbing others working in adjacent workspaces, or participating in separate meetings. In workspaces that also utilize a common camera system, it may also be undesirable or disruptive when non-participants and other persons in adjacent workspaces are incidentally captured in a video call or the like due to proximity.

The systems and methods described herein can improve the configuration and usage of audio-visual systems, such as, e.g., conferencing systems, stage performance systems, gaming systems, and others, by using audio coverage areas to define a "video fence" around one or more audio sources in order to focus image capture on the desired audio source(s) and exclude or remove other imagery located outside the corresponding audio coverage area. In embodiments, the video fence may be configured based on the boundaries of the audio coverage area and based further on a distance between a desired audio source and a boundary (or boundary line) of the audio coverage area that is located behind the audio source. For example, the boundaries of the audio coverage area may be used to define an image field for a camera of the audio-visual system that is used to capture video of the audio source. The distance from audio source to boundary line may be used to determine a depth of field parameter for adjusting a zone of focus of the camera so that the desired audio source is clearly visible, or in focus, and the area beyond the boundary line, or outside the video fence, is blurry and out of focus, or otherwise excluded from the video. In some embodiments, instead of, or in addition to, making the outer imagery appear blurry, other image enhancements may be applied to the corresponding portion of the image field, such as, for example, overlaying a select image or video on top of the outer imagery, so that the area outside the video fence is fully excluded from the video.

As used herein, the terms "lobe" and "microphone lobe" refer to an audio beam generated by a given microphone array (or array microphone) to pick up audio signals at a select location, such as the location towards which the lobe is directed. While the techniques disclosed herein are described with reference to microphone lobes generated by array microphones, the same or similar techniques may be utilized with other forms or types of microphone coverage (e.g., a cardioid pattern, etc.) and/or with microphones that are not array microphones (e.g., a handheld microphone, boundary microphone, lavalier microphones, etc.). Thus, the term "lobe" is intended to cover any type of audio beam or coverage.

Figure 7:
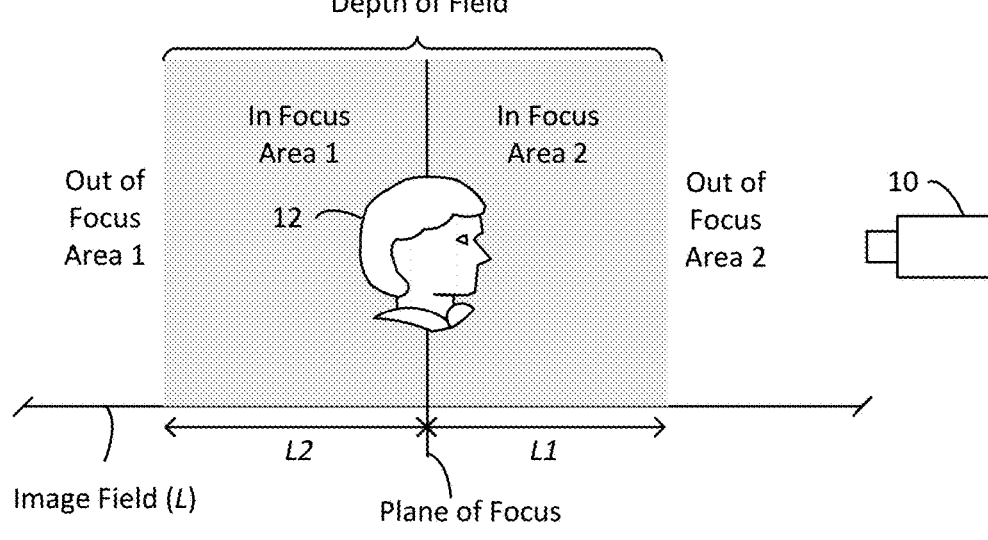
FIG. 7 is a schematic diagram showing an exemplary image field of an existing camera.

Referring initially to FIG. 7, shown is an exemplary image field of an existing camera 10. FIG. 7 is provided to help illustrate and explain various terminology used with cameras in general. As shown, the image field (or field of view) extends a select distance or length L in front of the camera 10. For example, the image field may extend from the lens of the camera 10 to a distal end located past an object 12 (e.g., person) to be captured. As shown, not all regions of the image field are in focus, or sharp and clearly visible. Rather, the image field includes a region known as "depth of field" that indicates a specific depth or range of the image field that has an acceptable level of sharpness, or otherwise appears to be in focus to the human eye. The depth of field includes a plane of focus that may be centered on a focal point or main subject of the image capture that is intended to be in focus, such as, e.g., the object 12 in FIG. 7. Other areas of the image field that are within the depth of field may also appear in focus, such as, e.g., in-focus areas 1 and 2 situated on either side of the plane of focus in FIG. 7. Conversely, areas outside the depth of field but still within the image field of the camera 10 may appear to be out of focus or blurry, such as, e.g., out of focus areas 1 and 2 in FIG. 7. For example, the out of focus areas may be too close to, or too far away from, the camera 10.

Thus, the depth of field may create a "zone of focus" (or apparent focus) around the object 12. Generally speaking, a shallow depth of field may create a narrow zone of focus, while a deeper depth of field may create a wider zone of focus. As shown in FIG. 7, the zone of focus extends a first distance or length L1 in front of the object 12, or towards the camera 10, and a second length L2 behind the object 12, or away from the camera 10. Moreover, the first length L1 includes the in-focus area 2 located between the plane of focus and the camera 10, and the second length L2 includes the in-focus area 1 located between the plane of focus and the distal end or limit of the image field. It should be appreciated that in some instances, the first length L1 and the second length L2 may not be equal distances and that the distance on either side of the plane of focus may depend on an aperture size of the camera 10 and/or other camera settings.

Figure 2:
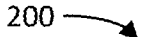
FIG. 2 is a schematic diagram of another exemplary environment comprising an audio-visual system configured to focus a first camera on a first audio source in a first audio coverage area and focus a second camera on a second audio source in a second audio coverage area, in accordance with one or more embodiments.

Referring now to FIG. 1, shown is an exemplary audio-visual environment 100 in which one or more of the systems and methods disclosed herein may be utilized, in accordance with embodiments. As shown, the environment 100 comprises a microphone 102, a camera 104, and one or more audio sources 106 located within an audio coverage area 108 of the microphone 102. The environment 100 may be a conference room, a boardroom, a classroom, or other meeting room; a theater, sports arena, auditorium, or other performance or event venue; or any other space. The one or more audio sources 106 may be human speakers or talkers participating in a conference call, telecast, webcast, class, seminar, performance, sporting event, or any other event, and may be situated at different locations around the environment 100. For example, the one or more audio sources 106 may be local participants of a conference call seated in respective chairs 110 disposed around a table 112, as shown in FIG. 1, or local audience members seated in chairs arranged in front of a podium or other presentation space (e.g., as shown in FIG. 2). While FIG. 1 illustrates one potential environment, it should be understood that the systems and methods disclosed herein may be utilized in any applicable environment.

The microphone 102 can be configured to detect sounds from the audio sources 106, such as human voice or speech spoken by the audio sources 106 and/or music, clapping, or other sounds generated by the same, and convert the detected sounds into one or more audio signals. Though only one microphone 102 is shown in FIG. 1, the microphone 102 can include one or more of an array microphone, a non-array microphone (e.g., directional microphones such as lavalier, boundary, etc.), or any other type of audio input device capable of capturing speech and other sounds. As an example, the microphone 102 may include, but is not limited to, SHURE MXA310, MX690, MXA910, MXA920, MXW1/2/8, ULX-D, and the like. The microphone 102 may be placed in any suitable location, including on a wall, ceiling, table, lectern, and/or any other surface in the environment 100, and may conform to a variety of sizes, form factors, mounting options, and wiring options to suit the needs of the particular environment. For example, one or more microphones may be placed on a table, lectern, or other surface near the audio sources in a classroom or conference room environment, or may be attached to the audio sources, e.g., a performer or speaker, in an auditorium, stadium, or musical hall environment. In some cases, one or more microphone may also be mounted overhead or on a wall to capture the sound from a larger area, e.g., an entire room or hall. The exact type, number, and placement of microphone(s) in a particular environment may depend on the locations of audio sources, listeners, physical space requirements, aesthetics, room layout, stage layout, and/or other considerations. In the illustrated embodiment, the microphone 102 may be positioned at a select location in the environment 100 in order to adequately capture sounds throughout the environment 100.

The camera 104 can be configured to capture still images or pictures, moving images, video, or other imagery of the environment 100 that is visible within an image field of the camera 104. Various parameters or settings may be used to control and/or configure one or more aspects of the camera 104. For example, an image field parameter defines an image field (or visible frame) of the camera 104. The image field parameter can be adjusted so that the image field includes a select region of the environment 100, such as, for example, the region comprising the one or more audio sources 106 situated around the table 112, or more generally, the audio coverage area 108. In embodiments, the image field parameter may include a distance value for configuring a length or other dimension of the image field (e.g., length L in FIG. 7) that determines how far the visible frame extends in front of the camera 104. As another example, a depth of field parameter defines a depth of field of the camera 104. The depth of field parameter can be configured or adjusted so that only a select portion of the image field is part of the depth of field, or appears in focus. In embodiments, the depth of field parameter may include a distance value for configuring a length or other dimension of the depth of field that determines how much of the audio coverage area 108 is in focus (or within the zone of focus).

In some embodiments, the camera 104 may be a standalone camera, while in other embodiments, the camera 104 may be a component of an electronic device, e.g., smartphone, tablet, etc. In some cases, the camera 104 may be included in the same electronic device as one or more other components of the environment 100, such as, e.g., the microphone 102. The camera 104 may be a pan-tilt-zoom (PTZ) camera that can physically move and zoom to capture desired images and video, or may be a virtual PTZ camera that can digitally crop and zoom images and videos into one or more desired portions. The environment 100 may also include a display, such as a television or computer monitor, for showing images and/or video associated with the remote participants of a conference call, for example, or other image or video content. In some embodiments, the display may include one or more microphones, cameras, and/or loudspeakers, for example, in addition to or including the microphone 102 and/or camera 104.

The audio coverage area 108 (also referred to herein as "audio pick-up region") represents an accepted audio pick-up zone for the microphone 102. In particular, the audio coverage area 108 defines a region or space within which the microphone 102 can deploy or focus beamformed audio lobes (not shown) for capturing or detecting desired audio signals, such as sounds produced by the one or more audio sources 106 located within the audio coverage area 108. In embodiments, the microphone 102 may be part of an audio system (or audio-visual system) that is configured to define the audio coverage area 108 based on, for example, predetermined audio coverage information, a known or calculated location of the microphone 102, known or expected locations of the one or more audio sources 106, and/or real-time locations of the audio source(s) 106.

The environment 100 may also include one or more other audio sources 114 that are located outside the audio coverage area 108, for example, as shown in FIG. 1. The one or more other audio sources 114 (also referred to herein as "out-of-area audio sources") may be human speakers or talkers located in a nearby workspace or other region of the environment 100 that is close enough to the audio coverage area 108 to be within the image field of the camera 104, or otherwise included in the visible frame during image capture of the one or more audio sources 106. For example, as shown in FIG. 1, the other audio source 114 may be a human speaker seated at another table 113 of the environment 100 that is near the table 112, but not participating in the conference call or other meeting occurring within the audio coverage area 108. In some cases, the other audio source 114 may be located within another audio coverage area (not shown) of the microphone 102 (see, e.g., FIG. 2). In some cases, the environment 100 may include a second camera (not shown) configured to capture a second area of the environment 100 that includes the other audio source 114 (see, e.g., FIG. 2).

As shown in FIG. 1, the environment 100 may further include a control module 116 for enabling a conferencing call, webinar, telecast, or otherwise implementing one or more aspects of the meeting or event, and/or carrying out one or more of the techniques described herein. The control module 116 may be implemented in hardware, software, or a combination thereof. In some embodiments, the control module 116 may be a standalone device, such as a controller, control device, computing device, or other electronic device, or included in such a device. In other embodiments, all or portions of the control module 116 may be included in the microphone 102 and/or the camera 104. In one exemplary embodiment, the control module 116 may be a generic computing device comprising a processor and a memory device. In another exemplary embodiments, the control module 116 may be part of a cloud based system or otherwise reside in an external network.

It should be understood that the components shown in FIG. 1 are merely exemplary, and that any number, type, and placement of the various components in the environment 100 are contemplated and possible, including, for example, different arrangements of the audio sources 106, audio sources 106 that move about the room, different arrangements of the audio coverage area 108, different locations for the microphone 102 and/or the camera 104, a different number of audio sources 106, microphones 102, cameras 104, and/or audio coverage areas 108, etc.

In various embodiments, the control module 116, the microphone 102, and the camera 104 can form, or be part of, an audio-visual system (such as, e.g., audio-visual system 500 shown in FIG. 5) that is configured to define a "video fence" around the one or more audio sources 106, so that the other audio sources 114, and any other persons or objects located outside the audio coverage area 108, are not visible in the images and/or video captured by the camera 104. The video fence may be implemented by the camera 104 using one or more parameters provided by the control module 116, such as, for example, the image field parameter for defining the image field, or field of view, of the camera 104 and/or the depth of field parameter for adjusting the depth of field, or zone of focus, of the camera 104. The one or more parameters may be configured by the control module 116 based on information received from the microphone 102, such as, for example, information defining a location of an active talker 106 and/or one or more boundaries of the audio coverage area 108.

More specifically, according to embodiments, the microphone 102 can be configured to provide boundary information that defines one or more boundaries or boundary lines 118 for the audio coverage area 108. The boundary lines 118 may delineate the outer limits of the audio coverage area 108, or where the coverage area 108 ends. The number of boundary lines 118 used to create a given audio coverage area can vary depending on the general shape of the area. For example, the audio coverage area 108 of FIG. 1 is configured to have a substantially rectangular-shape and thus, has four boundary lines 118. In some embodiments, the boundary information may also indicate the general shape of the audio coverage area 108 (e.g., rectangle, square, triangle, octagon, polygon, circle, oval, etc.) so that, for example, the expected number of boundary lines 118 and/or other information (e.g., angles at which the boundary lines 118 meet, etc.) can be predetermined. For example, if the audio coverage area has a circular or oval shape, the boundary information will only define one (continuous) boundary line. Though the illustrated embodiments depict boundary "lines," in other embodiments, the audio coverage area 108 may be defined by other types of boundaries 118, such as, e.g., one or more points, shapes, or other indicators.

In some embodiments, the microphone 102 may provide the control module 116 with other information about the audio coverage area 108, such as, for example, identification information for identifying each coverage area associated with the microphone 102 (e.g., Area 1, Area 2, etc.), location information for indicating the relative location of the audio coverage area 108, or any other coverage areas, within the environment 100, activity information for indicating which of the coverage areas are currently active, or any other pertinent information. In some embodiments, the control module 116 may store, in a memory, the boundary information for each coverage area previously identified by, or associated with, the microphone 102, and upon receiving the activity information from the microphone 102, the control module 116 may retrieve the corresponding boundary information from the memory.

The boundary information may define each boundary or boundary line 118 of the audio coverage area 108 using one or more coordinates (e.g., a set of end point coordinates), vectors, or any other suitable format. In some embodiments, each boundary line 118 may be defined by coordinates (e.g., Cartesian or rectangular coordinates, spherical coordinates, etc.) representing one or more points along the line 118, such as, e.g., a starting point, an ending point, and/or a central point of the line 118. In FIG. 1, for example, a first one of the boundary lines 118 (or "first boundary line") may be defined by a first set of coordinates (a1, b1, c1) that represent the central point p of the first boundary line 118. The boundary information may be previously known and stored in a memory of the microphone 102 and/or may be determined, at least partially, by the microphone 102, e.g., using a processor of the microphone 102, based on other information known about the audio coverage area 108 (e.g., location, size, center point, number of boundary lines, shape of coverage area, etc.). In some embodiments, the boundary line coordinates received at the control module 116 may be relative to a coordinate system of the microphone 102. In other embodiments, the boundary line coordinates may be relative to a coordinate system of the environment 100 and may be translated or converted to the coordinate system of the microphone 102, or vice versa, by the control module 116 or the microphone 102.

The microphone 102 can also be configured to provide sound location information that indicates a detected sound position of an active audio source 106 (or "active talker") located within the audio coverage area 108. The detected sound position, or the location at which the microphone 102 detects audio or sound generated by the active talker 106, may be relative to the microphone 102 and may be provided as a set of coordinates. For example, the microphone 102 may be configured to generate a localization of the detected sound and determine coordinates (or "localization coordinates") that represent the position of the detected sound relative to the microphone 102. Various methods for generating sound localizations are known in the art, including, for example, generalized cross-correlation ("GCC") and others. The localization coordinates may be Cartesian or rectangular coordinates that represent a location point in three dimensions, or x, y, and z values. For example, using localization techniques, the microphone 102 may identify the location of the active talker 106 as detected sound position s with coordinates (x1, y1, z1). In some embodiments, the localization coordinates may be converted to polar or spherical coordinates, i.e. azimuth (phi), elevation (theta), and radius (r), for example, using a transformation formula, as is known in the art. The spherical coordinates may be used in various embodiments to determine additional information about the audio system, such as, for example, a distance between the active talker 106 and the microphone 102. In some embodiments, the localization coordinates for the detected sound position may be relative to a coordinate system of the microphone 102 and may be converted or translated to a coordinate system of the environment 100, or vice versa.

In some embodiments, the control module 116 may receive other types of information for identifying a talker location, in addition to, or instead of, the audio source localization coordinates. For example, the environment 100 may further include one or more other sensors (i.e. besides the microphone 102) that are configured to detect or determine a current location of a human talker or other audio source within an audio coverage area. Such additional sensors may include a thermal sensor, a Time-of-Flight ("ToF") sensor, an optical sensor, and/or any other suitable sensor or device.

In embodiments, the control module 116 can be configured to use the boundary information to determine or adjust the image field parameter for the camera 104 so that the audio coverage area 108, and the audio sources 106 situated therein, fall within the image field, or visible frame, of the camera 104. For example, the control module 116 may determine or calculate one or more distance values (e.g., length L in FIG. 7) for the image field parameter based on the locations of the one or more boundaries 18 relative to the camera 104, or otherwise configure the image field parameter so that at least the boundaries 118 of the audio coverage area 108 are included within the visible frame of the camera 104. The control module 116 may provide the image field parameter to the camera 104, and the camera 104 may adjust its image field accordingly.

In some embodiments, a position of the camera 104, relative to the microphone 102 and/or the environment 100, may be previously known and stored in a memory of the camera 104. In such cases, the camera 104 may be configured to provide camera location information to the control module 116, and the control module 116 may be configured to use both the camera location information and the boundary information to optimize the image field parameter, or the determination thereof. For example, the control module 116 may first use the camera location information to determine a location of the camera 104 relative to the audio coverage area 108, or more specifically, each of the one or more boundaries 118. This may include, for example, determining a distance from the camera 104 to each boundary line 118, determining an orientation of the audio coverage area 108 relative to a lens or field of view of the camera 104, and/or determining which of the boundary lines 118 is located closest or adjacent to the camera 104 and which of the boundary lines 118 is located opposite or across from the camera 104. The control module 116 may use the relative location of the camera 104 to determine or adjust the image field parameter for the camera 104, so that the entire audio coverage area 108 is visible within the image field.

In some cases, while the image field is configured based on the one or more boundaries 118 of the audio coverage area 108, the camera 104 may still capture imagery located outside the audio coverage area 108, such as, e.g., the regions that are located near or adjacent to the boundary lines 118, or are otherwise visible in the distance and/or beyond the target area. For example, in FIG. 1, the camera 104 may capture the other audio source 114 and/or one or more of the other tables 113 which are located behind the active talker 106 and outside the audio coverage area 108. In various use cases, it may be undesirable to include persons and/or objects that are not intended to be part of the conferencing call or other audio-visual event. For example, the other persons may not have consented to having their image captured, or may be viewed as a nuisance or distraction by the participants of the event.

In embodiments, the control module 116 can be configured to adjust or optimize the image field, or more specifically, the zone of focus within the image field, so that any imagery of unwanted persons, objects, and/or regions (e.g., the region outside the audio coverage area 108) has limited or no visibility, or is otherwise excluded from the captured images and/or video. To achieve this, the control module 116 may first determine a position of the active talker 106 relative to the microphone 102 and/or the audio coverage area 108 of the microphone 102. According to various embodiments, the control module 116 can be configured to use the localization coordinates for the detected sound position s (or "talker location") to determine a relative location of the active talker 106 within the audio coverage area 108, or the location of the talker 106 relative to the boundaries of the coverage area 108. For example, based on the localization coordinates and the boundary information for the audio coverage area 108, the control module 116 can determine which of the boundary lines 118 is located nearest or closest to the active talker 106 by calculating a distance between the detected sound position s and a known point on each of the boundary lines 118 and comparing the calculated distances to identify the smallest distance. In the illustrated example, the control module 116 may determine that the detected sound position s is closest to a first boundary or boundary line 118a located directly behind the active talker 106, based on a distance between the first set of coordinates (a1, b1, c1) for the first boundary line 118a and the localization coordinates (x1, y1, z1) (or "talker coordinates").

The control module 116 can further determine a relative location of the active talker 106 by calculating an amount of the audio coverage area 108 that remains between the active talker 106 and the first or closest boundary line 118a, or otherwise extends beyond the detected sound position s. In some embodiments, the control module 116 can quantify this amount by calculating a proximity, or first distance d, between the detected sound positions and the closest boundary line 118a. For example, the control module 116 may determine that a second point p2 of the first boundary line 118a, represented by a second set of coordinates (a2, b2, c2), is located closest to the detected sound position s, as shown in FIG. 1, and may use this second point p2 to calculate the first distance d (e.g., by calculating a distance between the talker coordinates (x1, y1, z1) and the second set of coordinates (a2, b2, c2)). As another example, the control module 116 may quantify the remaining amount of coverage area 108 by calculating a second distance between the microphone 102 and the central point p of the first boundary line 118a (e.g., using the first set of coordinates (a1, b1, c1), calculating a third distance between the microphone 102 and the detected sound position s (e.g., using the talker coordinates), and subtracting the third distance from the second distance to find a distance between the detected sound position s and the first boundary line 118a, i.e. the first distance d. In either case, the control module 116 may use the first distance d to determine the amount of audio coverage area 108 remaining behind or beyond the active talker 106.

Once the position of the active talker 106 relative to the audio coverage area 108 is determined, the control module 116 can use the relative position information to optimize the image field of the camera 104 so that only the region of the environment 100 that falls within the audio coverage area 108 appears sharp and in focus, and any region located outside the audio coverage area 108 is out of focus, blurry, or is otherwise limited in visibility. According to various embodiments, the control module 116 may achieve this by using the first distance d between the detected sound positions and the first (or closest) boundary line 118a to determine or adjust the depth of field parameter for the camera 104. For example, the control module 116 may be configured to select or calculate a distance value for the depth of field parameter based on the first distance d, or otherwise configure the depth of field for the camera 104 to extend no further back than the first distance d from the detected sound position s. In this manner, the control module 116 can use the first distance d to adjust a zone of focus of the camera 104 to include a first area 120 of the image field that is between the active talker 106 and the first boundary line 118 (e.g., in-focus area 1 in FIG. 7), and exclude a second area 122 of the image field (e.g., out of focus area 1 in FIG. 7) that is beyond the first boundary line 118a, or more than the first distance d away from detected sound position s. In some embodiments, the depth of field parameter may be configured so that a distance value for a second length (e.g., L2) of the depth of field, or the portion of the zone of focus that extends behind the active talker 106, is substantially equal to or less than the first distance d. Other techniques for configuring the depth of field parameter based on the relative position of the active talker 106 within the audio coverage area 108 are also contemplated and may be used instead of or in addition to the above-described techniques.

In embodiments where the camera's location is known or has been determined, the control module 116 may be configured to use the camera location information and/or the camera's relative location information to optimize boundary line selection for configuring the depth of field parameter of the camera 104. For example, using the location of the camera 104 relative to the audio coverage area 108, the control module 116 can determine which of the boundary lines 118 is located at or near a distal end of the camera's image field (or opposite the camera 104) and thus, most likely to be positioned behind the active talker 106. In FIG. 1, for example, the control module 116 may use the camera location information to identify the first boundary line 118a as being located near the distal end of the image field of the camera 104 (or the opposite side of the camera's field of view). The control module 116 can then use the identified boundary line 118a to configure the depth of field parameter. For example, the control module 116 may calculate a distance value for the depth of field parameter, or more specifically, the second length behind the active talker 106, based on a distance between the camera 104 and the identified boundary line 118a (e.g., using the second set of coordinates (a2, b2, c2)).

In some embodiments, in addition to configuring the depth of field of the camera 104 so that only the regions of the image field that coincide with the audio coverage area 108 are in focus, the control module 116 may be configured to apply an image enhancement to imagery depicting the second area (e.g., out of focus area 1 in FIG. 7), or the portion of the image field that extends beyond the first boundary line 118*a* and outside the audio coverage area 108. For example, a video captured by the camera 104 may include imagery of the active talker 106 seated in the first area 120 in a foreground of the video and imagery of the second area 122 in a background of the video. The control module 116 may alter or enhance such videos by adding an image enhancement to cover up, exclude, or block the second area 122 from the captured video. The image enhancement may be applied only to the portion of the captured imagery that depicts the second area 122 of the image field and may leave the rest of the imagery untouched. In some embodiments, the image enhancement may be a select image that is displayed on top of or over the portion of the captured imagery that shows the second area 122, so that imagery of the second area 122 is no longer visible within the video output by the camera 104. In other embodiments, the image enhancement may be a blurring effect or other type of visual effect that is applied to imagery of the second area 122 in order to further reduce a visibility of the second area 122 within the video output by the camera 104. In some cases, the blurring effect may be an additional layer of blurring or obscuring that is applied to the captured imagery after adjusting the zone of focus to exclude the second area 122. That is, the blurring effect may blur or adjust the captured imagery in a different manner or to a different degree than the out of focus blurring that occurs from placing a region outside the depth of field. Other types of image enhancement are contemplated and may be included in addition to or instead of the examples provided herein.

Figure 3:
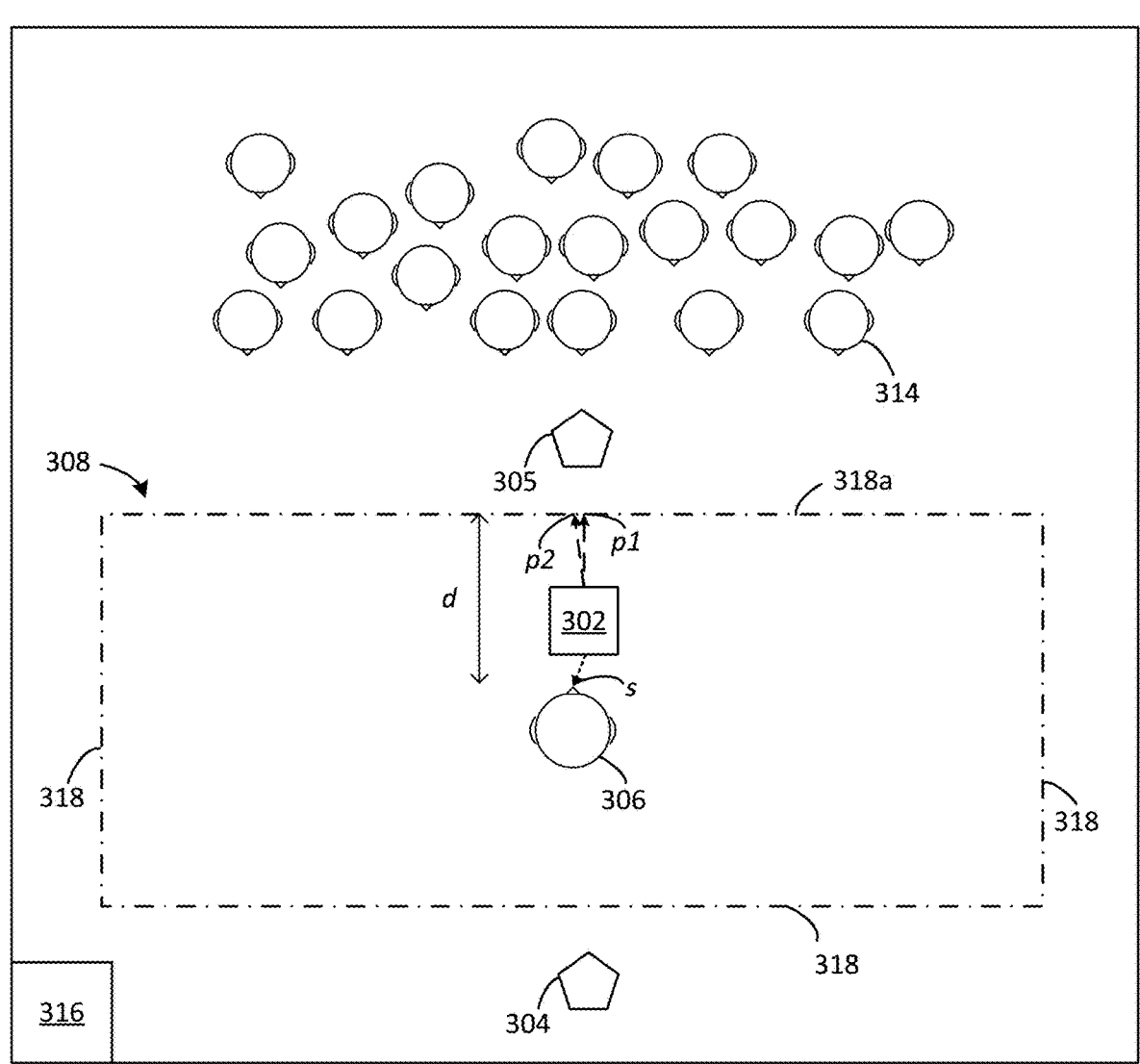
FIG. 3 is a schematic diagram of another exemplary environment comprising another audio-visual system that can be utilized to focus image capture on a select audio source within an audio coverage area and exclude unwanted imagery outside the audio coverage area, in accordance with one or more embodiments.
Figure 4:
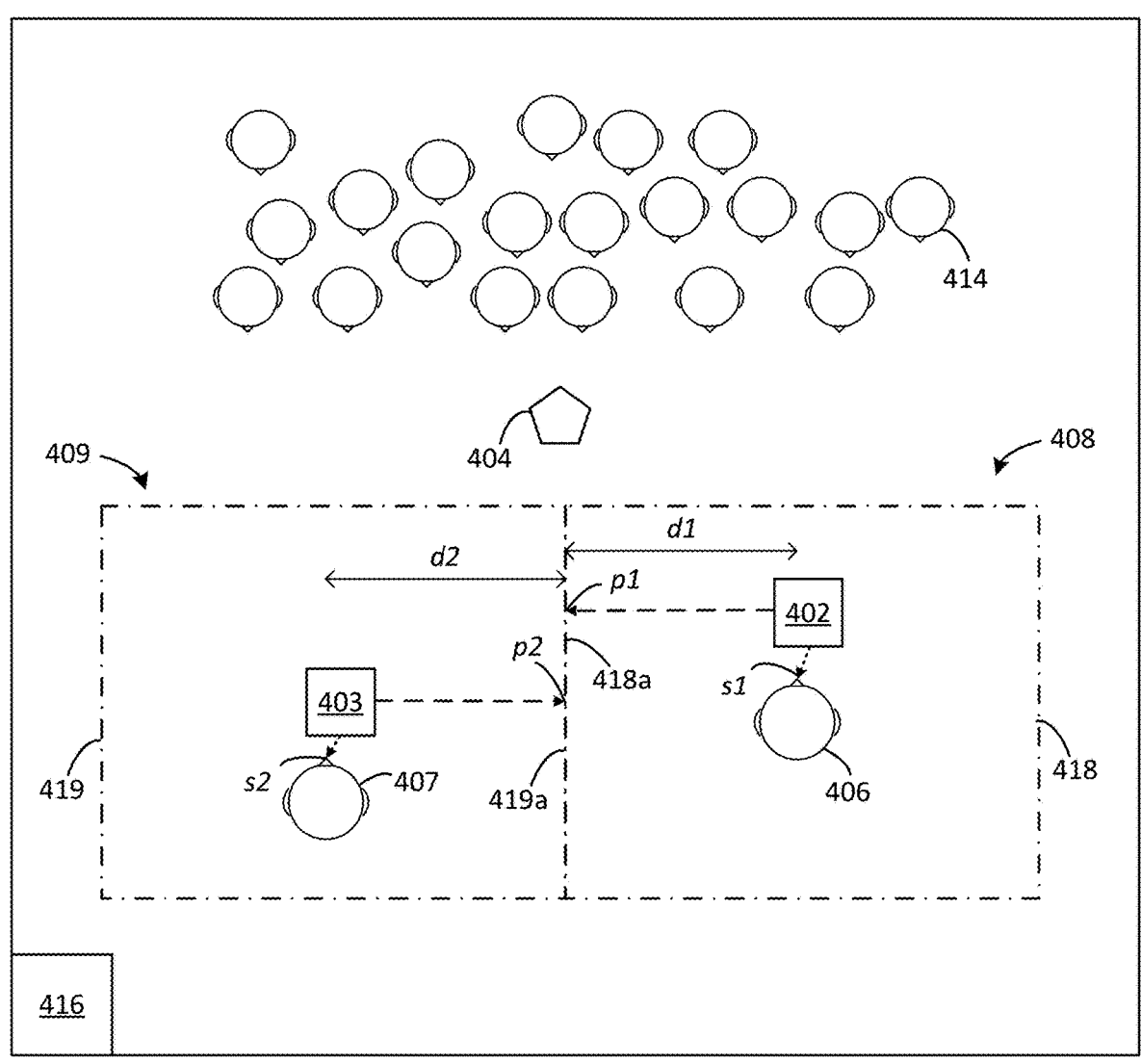
FIG. 4 is a schematic diagram of another exemplary environment comprising another audio-visual system that can be utilized to individually focus image capture on each of a plurality of audio sources within an audio coverage area, in accordance with one or more embodiments.

FIGS. 2 through 4 illustrate additional audio-visual environments 200, 300, and 400, respectively, in which the systems and methods disclosed herein may be utilized, in accordance with various embodiments. Several aspects of these environments, or uses cases, may be similar to those of the audio-visual environment 100 shown in FIG. 1 and described herein. For example, each of the environments 200, 300, and 400 comprises at least one microphone that is substantially similar to the microphone 102 of FIG. 1, at least one camera that is substantially similar to the camera 104 of FIG. 1, and at least one control module that is substantially similar to the control module 116 of FIG. 1. Accordingly, in the following paragraphs, the aspects of the environments 200, 300, and 400 that are common to the environment 100 will not be described in great detail, for the sake of brevity.

Referring now to FIG. 2, shown is an exemplary use case in which multiple video fences are provided in order to allow the use of multiple cameras to capture images and/or video of audio sources located in separate audio coverage areas of a microphone. In such cases, the techniques described herein can be used to create a first video fence around a first audio coverage area encompassing a first audio source and a second video fence around a second audio coverage area encompassing a second audio source. The first video fence may be used by a first camera to capture imagery of the first audio source and exclude or blur imagery of regions outside the first audio coverage area. Similarly, the second video fence may be used by a second camera to capture imagery of the second audio source and exclude or blur imagery of regions outside the second audio coverage area.

More specifically, the audio-visual environment 200 comprises a microphone 202, a first camera 204, a second camera 205, a first audio source 206 located within a first audio coverage area 208 of the microphone 202, and a second audio source 207 located within a second audio coverage area 209 of the microphone 202. The environment

200 may be a classroom, lecture hall, auditorium, courtroom, church or other place of worship, or any other event space having a first designated region for a presenter or performer (e.g., the first audio source 206) and a second designated region for one or more audience members (e.g., the second audio source 207 and/or one or more other audio sources 214), as shown. The first region (or "presenter space") may include a podium, desk, stage, or the like. The second region (or "audience space") may include one or more tables and/or chairs or other types of seating. As an example, the environment 200 may be used to capture audio and/or video of a lecture, meeting, performance, or other event.

According to embodiments, the microphone 202 may be configured to assign each of the audio coverage areas 208 and 209 to a respective region of the environment 200, so that audio or sounds generated in each region of the environment 200 can be captured as a separate audio signal. For example, the first audio coverage area 208 may be used to capture sounds generated in the presenter space, and the second audio coverage area 209 may be used to capture sounds generated in the audience space (or vice versa). In most cases, the presenter 206 may be the primary source of audio in the environment 200 and thus, the first audio coverage area 208 may be active or "on" for most of the event. In such cases, the second audio coverage area 209 may be inactive or "off" or otherwise used to prevent audio generated in the audience space from being included in the presenter's audio. In some cases, one or more of the audio sources 207 and 214 in the audience space (or audience members) may speak or otherwise generate audio as well. For example, at some point, the second audio source 207 may be actively speaking at the same time as, or instead of, the first audio source 206. In such cases, the second audio coverage area 209 may be turned on or otherwise activated, so that the audio generated by the second audio source 207 (and/or others) can be captured as well.

According to various embodiments, the environment 200 also comprises a control module 216 communicatively coupled to each of the microphone 202, the first camera 204, and the second camera 205. Like the control module 116, the control module 216 can be configured to implement one or more aspects of the meeting or event occurring in the environment 200 and/or carry out one or more of the techniques described herein.

In embodiments, the control module 216, the microphone 202, the first camera 204, and the second camera 205 can form, or be part of, an audio-visual system (such as, e.g., audio-visual system 500 shown in FIG. 5) that is configured to define a first video fence around the presenter 206, so that the second audio source 207 and/or the other audio sources 214, and any other persons or objects located outside the first audio coverage area 208, are not visible in the images and/or video captured by the first camera 204. In some embodiments, the control module 216 is further configured to define a second video fence around one or more of the audience members 207 and 214, so that the presenter 206, and any other persons or objects located outside the second audio coverage area 209, are not visible in the images and/or video captured by the second camera 205. The first and second video fences may be implemented by the first and second cameras 204 and 205, respectively, using one or more parameters provided by the control module 216, such as, for example, a first image field parameter for defining a first image field of the first camera 204, a second image field parameter for defining a second image field of the second camera 205, a first depth of field parameter for adjusting a first depth of field of the first camera 204, and/or a second depth of field parameter for adjusting a second depth of field of the second camera 205. The one or more parameters may be configured by the control module 216 based on information received from the microphone 202, such as, for example, information defining a location of the first audio source 206, a location of the second audio source 207, one or more boundaries of the first audio coverage area 208, and/or one or more boundaries of the second audio coverage area 209.

More specifically, like the microphone 102, the microphone 202 may be configured to provide boundary information defining one or more first boundaries or boundary lines 218 for the first audio coverage area 208 and one or more second boundaries or boundary lines 219 for the second audio coverage area 209. The boundary information may include one or more sets of coordinates for defining the boundaries 218 and 219. For example, a first boundary or boundary line 218a of the one or more boundaries 218 may be defined by a first set of coordinates (a1, b1, c1) that represent a first central point p1 of the first boundary line 218a. As another example, a second boundary or boundary line 219a of the one or more second boundaries 219 may be defined by a second set of coordinates (a2, b2, c2) that represents a second central point p2 of the second boundary line 219a. In the illustrated embodiment, the first boundary line 218a is located behind the first audio source 206 and may be closest to the first audio source 206, while the second boundary line 219a is located behind the second audio source 207 and may be closest to the second audio source 207.

The microphone 202 may also provide sound localization information to the control module 216, like the microphone 102. For example, the sound localization information may include a first set of coordinates (x1, y1, z1) representing a first detected sound position s1 for the first audio source 206 and a second set of coordinates (x2, y2, z2) representing a second detected sound position s2 for the second audio source 207. In some embodiments, the control module 216 may be configured to combine the sound localization information with other types of sensor information, such as, e.g., thermal, ToF, optical, etc., in order to more accurately identify the talker location.

Using the techniques described herein, the first boundary line 218a and the first detected sound position s1 may be used to define or adjust the first depth of field parameter for the first camera 204 so that the camera's zone of focus only includes the first audio coverage area 208, or does not extend beyond the first boundary line 218a. For example, the control module 216 may determine that a third point p3 of the first boundary line 218a, represented by a third set of coordinates (a3, b3, c3), is located closest to the first detected sound position s1 and may use this third point p3 to calculate a first distance d1 between the first audio source 206 and the first boundary line 218a.

Likewise, using the techniques described herein, the second boundary line 219a and the second detected sound position s2 may be used to define or adjust the second depth of field parameter for the second camera 205 so that its zone of focus only includes the second audio coverage area 209, or does not extend beyond the second boundary line 219a. For example, the control module 216 may determine that a fourth point p4 of the second boundary line 219a, represented by a fourth set of coordinates (a4, b4, c4), is located closest to the second detected sound position s2 and may use this fourth point p4 to calculate a second distance d2 between the second audio source 207 and the second boundary line 219a.

In some embodiments, similar techniques may be used to set a front limit to the depth of field for each camera 204, 205, so that the areas in front of the first audio coverage area 208 are not included in the zone of focus of the first camera 204, and vice versa. This ensures, for example, that imagery captured by the first camera 204 is focused on the presenter 206 and does not also include the backs of the audience members 207 and 214 or other unwanted areas of the second audio coverage area 209, and that imagery captured by the second camera 205 is focused on the audience and does not also include the back of the presenter 206. The control module 216 can be configured to implement the front limits by adjusting the depth of field parameters based on a "front" boundary of each audio coverage area. More specifically, the control module 216 may be configured to determine the first depth of field parameter for the first camera 204 based on a front boundary of the first audio coverage area 208, or the boundary line 218 that is located in front of the first audio source 206 (or "front boundary line"). For example, the microphone 202 may be configured to calculate a distance from the first audio source 206 to the front boundary line of the first audio coverage area 208, and the control module 216 may be configured to use this distance to adjust a front length (e.g., L1 in FIG. 7) of the first depth of field parameter for the first camera 204. Similarly, the second depth of field parameter for the second camera 205 may be configured based on a front boundary of the second audio coverage area 209, or the boundary line 219 that is located in front of the audience members 207 and 214.

Thus, the second audio-visual environment 200 can be used to focus the first camera 204 on the first audio source 206 and exclude, from the zone of focus of the first camera 204, any areas outside the first audio coverage area 208, and similarly focus the second camera 205 on the second audio source 207 and/or the other audio sources 214 and exclude, from the zone of focus of the second camera 205, any areas outside the second audio coverage area 209.

While FIG. 2 shows a specific use case, it should be appreciate that the techniques described herein may be used in any environment with two or more audio coverage areas and two or more cameras. For example, in a conferencing environment like that shown in FIG. 1, a second audio coverage area could be added around the other audio source 114 seated outside the audio coverage area 108 and a second camera could be added to the environment 100 for capturing images and/or video of the other audio source 114 and/or the second audio coverage area.

Referring now to FIG. 3, shown is another exemplary use case with multiple cameras for capturing different views or angles of a given room or other event space. More specifically, FIG. 3 illustrates an exemplary audio-visual environment 300 that comprises a microphone 302, a first camera 304, a second camera 305, and one or more audio sources 306 located in an audio coverage area 308 of the microphone 302. The environment 300 may be a theater, auditorium, place of worship, lecture hall, or any other event space having a designated area for performers or presenters (e.g., the one or more audio sources 306) and one or more other areas for audience members viewing the event (e.g., other audio sources 314). The designated area may include a stage or other performance space, for example, and the environment 300 may be used to capture audio and/or video of a lecture, a show (e.g., theater, comedy, musical, etc.), or other performance.

According to various embodiments, the audio coverage area 308 may be configured to include only the designated area (or stage area) and exclude the audience space, as shown. Likewise, the first and second cameras 304 and 305 may be configured to capture images and/or video of only the designated stage area and/or the audio source 306 located thereon. For example, as shown in FIG. 3, the first camera 304 may be located near a back of the stage area and may be directed towards a front of the stage area, or a back of the performer 306, while the second camera 305 may be located near the front of the stage area and may be directed towards the back of the stage area, or a front of the performer 306. Thus, both cameras 304 and 305 may be directed towards the audio source 306 but from different angles.

According to embodiments, the environment 300 also comprises a control module 316 communicatively coupled to each of the microphone 302, the first camera 304, and the second camera 305. Like the control module 116, the control module 316 can be configured to implement one or more aspects of the performance or event occurring in the environment 300 and/or carry out one or more of the techniques described herein.

In embodiments, the control module 316, the microphone 302, the first camera 304, and the second camera 305 can form, or be part of, an audio-visual system (such as, e.g., audio-visual system 500 shown in FIG. 5) that is configured to define a video fence around the performer 306 and/or the designated stage area, so that the audience members 314, or any other persons or objects located outside the audio coverage area 308, are not visible in the images and/or video captured by the first camera 304. The video fence may be implemented by the first camera 304 using one or more parameters provided by the control module 316, such as, for example, an image field parameter for defining an image field of the first camera 304 and/or a depth of field parameter for adjusting a depth of field of the first camera 304. The one or more parameters may be configured by the control module 316 based on information received from the microphone 302, such as, for example, information defining a location of the audio source 306 and/or one or more boundaries of the audio coverage area 308.

More specifically, like the microphone 102, the microphone 302 may be configured to provide boundary information defining a plurality of boundary lines 318 for the audio coverage area 308. The boundary information may include one or more sets of coordinates for defining the boundary lines 318. For example, a first boundary line 318$a$ of the plurality of boundary lines 318 may be defined by a first set of coordinates (a1, b1, c1) that represents a central point p1 of the first boundary line 318$a$. In the illustrated embodiment, the first boundary line 318$a$ (or "front boundary line") is located in front of the audio source 306 and is used to exclude the audience members 311 from imagery captured by the first camera 304. The microphone 302 may also provide sound localization information to the control module 316, like the microphone 102. For example, the sound localization information may include a first set of coordinates (x1, y1, z1) representing a detected sound position s for the audio source 306.

Using the techniques described herein, the front boundary line 318$a$ and the detected sound position s may be used to define or adjust the depth of field parameter for the first camera 304 so that the camera's zone of focus only includes the audio coverage area 308, or does not extend beyond the front boundary line 318$a$. For example, the control module 316 may determine that a second point p2 of the front boundary line 318$a$, represented by a second set of coordinates (a2, b2, c2), is located closest to the detected sound position s and may use this second point p2 to calculate a distance d between the audio source 306 and the front boundary line 318$a$. Thus, the audio-visual environment 300 can be used to focus the first camera 304 on the audio source 306, and exclude, from the zone of focus of the first camera 304, any areas outside the audio coverage area 308, including the audience members 314 situated in front of the performer 306.

FIG. 4 illustrates an exemplary use case in which multiple video fences are provided for the same designated area so that a given camera can alternate its focus between different audio sources, or regions, of the designated area. For example, a first video fence may encompass a first audio source and a second video fence may encompass a second audio source located a short distance away from the first audio source. The camera may switch or alternate between the two video fences, for example, depending on which audio source is actively generating sound.

More specifically, FIG. 4 illustrates an exemplary audio-visual environment 400 that comprises a first microphone 402, a second microphone 403, a camera 404, a first audio source 406 located in a first audio coverage area 408 of the first microphone 402, and a second audio source 407 located in a second audio coverage area 409 of the second microphone 403. The environment 400 may be a theater, auditorium, place of worship, lecture hall, or any other event space having a designated area for performers or presenters (e.g., the audio sources 406 and 407) and one or more other areas for audience members viewing the event (e.g., other audio sources 414). The designated area may include a stage or other performance space, for example, and the environment 400 may be used to capture audio and/or video of a lecture, a show (e.g., theater, comedy, musical, etc.), or other performance.

According to various embodiments, the first and second audio coverage areas 408 and 409 may be configured to include or cover different portions of the designated area (or stage area). For example, the first audio coverage area 408 may include a first portion of the stage area and the second audio coverage area 408 may include a second portion of the stage area that is adjacent to the first portion, as shown. However, both areas 408 and 409 may be configured to exclude the audience space, as also shown. Likewise, the camera 404 may be configured to capture images and/or video of only the designated stage area. For example, as shown in FIG. 4, the camera 404 may be located near a front of the stage area and may be directed towards the stage area, or away from the audience space.

According to embodiments, the environment 400 also comprises a control module 416 communicatively coupled to each of the first microphone 402, the second microphone 403, and the camera 404. Like the control module 116, the control module 416 can be configured to implement one or more aspects of the performance or event occurring in the environment 400 and/or carry out one or more of the techniques described herein.

In embodiments, the control module 416, the first microphone 402, the second microphone 403, and the camera 404 can form, or be part of, an audio-visual system (such as, e.g., audio-visual system 500 shown in FIG. 5) that is configured to define an individual video fence around each of the audio sources 406 and 407 within the designated stage area, so that the second audio source 407 is not clearly visible in imagery captured by the first video fence, and vice versa. The video fences may be implemented by the camera 404 using one or more parameters provided by the control module 416, such as, for example, an image field parameter for defining an image field of the camera 404 and/or a depth of field parameter for adjusting a depth of field of the camera 404. The one or more parameters may be configured by the control module 416 based on information received from each of the first and second microphones 402 and 403, such as, for example, information defining a location of each of the first and second audio sources 406 and 407 and/or one or more boundaries of each of the first and second audio coverage areas 408 and 409.

More specifically, the first microphone 402 may be configured to provide boundary information defining a first plurality of boundary lines 418 for the first audio coverage area 408, and the second microphone 403 may be configured to provide boundary information defining a second plurality of boundary lines 419 for the second audio coverage area 409. The boundary information may include one or more sets of coordinates for defining the boundary lines 418 and 418. For example, a first boundary line 418a of the first plurality of boundary lines 418 may be defined by a first set of coordinates (a1, b1, c1) that represents a central point p1 of the first boundary line 418a. In the illustrated embodiment, the first boundary line 418a (or "left side boundary line") is located near a left side of the first audio source 406, or towards the second audio source 407 and thus, is used to exclude the second audio source 407 from imagery captured by the camera 404 using the first video fence. As another example, a second boundary line 419a of the second plurality of boundary lines 419 may be defined by a second set of coordinates (a2, b2, c2) that represents a second central point p2 of the second boundary line 419a. In the illustrated embodiment, the second boundary line 419a (or "right side boundary line") is located near a right side of the second audio source 407, or towards the first audio source 406, and thus, is used to exclude the first audio source 406 from imagery captured by the camera 404 using the second video fence.

Each of the microphones 402 and 403 may also provide sound localization information to the control module 416, like the microphone 102. For example, the first microphone 402 may provide sound localization information that includes a first set of coordinates (x1, y1, z1) representing a first detected sound position s1 for the first audio source 406. Similarly, the second microphone 403 may provide sound localization information that includes a second set of coordinates (x2, y2, z2) representing a second detected sound position s2 for the second audio source 407.

Using the techniques described herein, the control module 416 may implement the first video fence by using the first boundary line 418a and the first detected sound position s/to define or adjust the depth of field parameter for the camera 404 so that the camera's zone of focus only includes the first audio coverage area 408 and thus, does not extend beyond the first boundary line 418a. For example, the control module 416 may determine that the first boundary line 418a is located closest to the second video fence and may use the first point p1 on the first boundary line 418a to calculate a first distance d1 between the first audio source 406 and the first boundary line 418a.

Similarly, using the techniques described herein, the control module 416 may implement the second video fence by using the second boundary line 419a and the second detected sound position s2 to define or adjust the depth of field parameter for the camera 404 so that the camera's zone of focus only includes the second audio coverage area 409 and thus, does not extend beyond the second boundary line 419a. For example, the control module 416 may determine that the second boundary line 419a is located closest to the first video fence and may use the second point p2 on the second boundary line 419a to calculate a second distance d2 between the second audio source 407 and the second boundary line 419a.

Thus, the audio-visual environment 400 can be used to create two separate video fences using the same camera 404 and configure each video fence to focus on an select audio source 406/407 and exclude, from the zone of focus of the camera 404, the other audio source 407/406 and any other areas outside the corresponding audio coverage area 408/409. In some cases, the environment 400 may include multiple cameras, and each video fence may be assigned to a separate camera. In such cases, the video output may include imagery captured using the first video fence displayed adjacent to imagery captured using the second video fence, for example, as side-by-side stripes of video or as video tiles, or may otherwise stitch the two videos together to appear as one.

Figure 5:
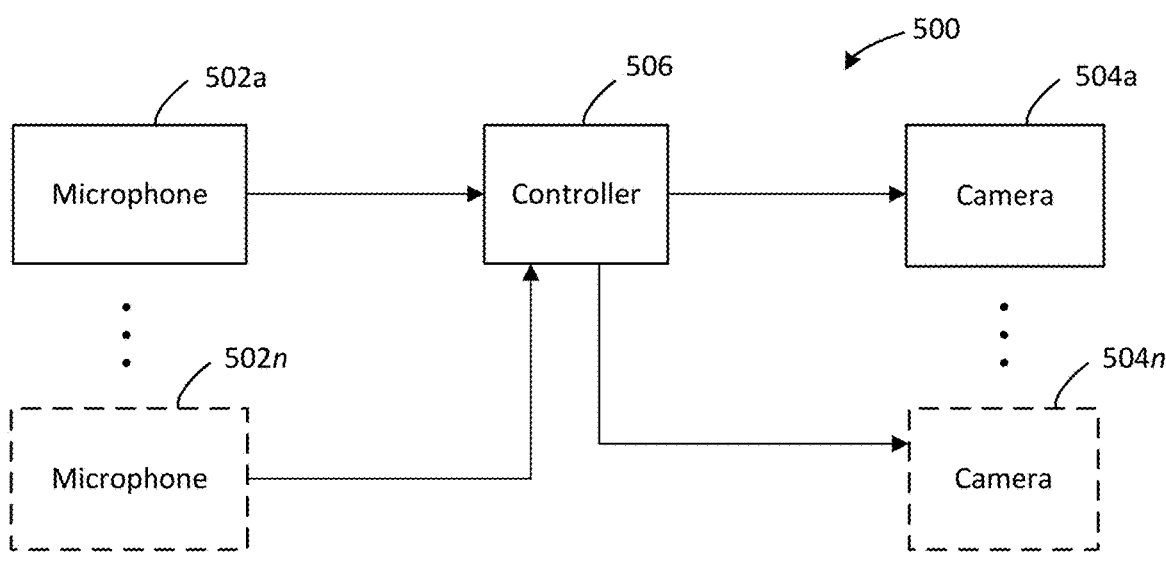
FIG. 5 is a block diagram of an exemplary audio-visual system, in accordance with one or more embodiments.

FIG. 5 illustrates an exemplary audio-visual system 500 that may be usable as the audio-visual system of any of the environments 100, 200, 300, and 400 described herein, in accordance with embodiments. As shown, the system 500 comprises at least one microphone 502a . . . , 502n that may be similar to, or usable as, the microphone 102 of FIG. 1 or any of the other microphones described herein and at least one camera 504a . . . , 504n that may be similar to, or usable as, the camera 104 of FIG. 1 or any of the other cameras described herein. The system 500 also comprises a controller 506 that may be similar to, or usable as, the control module 116 of FIG. 1 or any of the other control modules described herein. In particular, like the control module 116, the controller 506 may be implemented in hardware, software, or a combination thereof.

As shown, the at least one microphone 502a . . . , 502n can be configured to provide information to the controller 506, such as, for example, audio information (e.g., audio signals captured by the microphone(s)), boundary information for one or more audio coverage areas, and/or sound location information for one or more audio sources. In some embodiments, the controller 506 may also receive other types of sensor information (e.g., thermal, ToF, optical, etc.) from the microphone and/or one or more other sensors for determining the location of a human talker or other audio source. The controller 506 can be configured to generate one or more parameters, images or image data, and/or control signals based on the received information, and provide the same to the at least one camera 504a . . . , 504n, such as, for example, image field parameters, depth of field parameters, and/or image enhancement data. According to various embodiments, the components of the audio-visual system 500 may use a wired or wireless connection to transmit information to the controller 506 or receive information therefrom.

It should be understood that the components shown in FIG. 5 are merely exemplary, and that any number, type, and placement of the various components of the audio-visual system 500 are contemplated and possible. For example, in FIG. 5, there may be multiple controllers coupled between the camera(s) 504a . . . , 504n and the microphone(s) 502a . . . , 502n. As shown, in some embodiments, the controller 506 may be a standalone device (such as a control device, computing device, or other electronic device) or included in such a device. In other embodiments, all or portions of the controller 506 may be included in one or more of the microphone(s) 502a . . . , 502n and/or one or more of the camera(s) 504a . . . , 504n.

Figure 6:
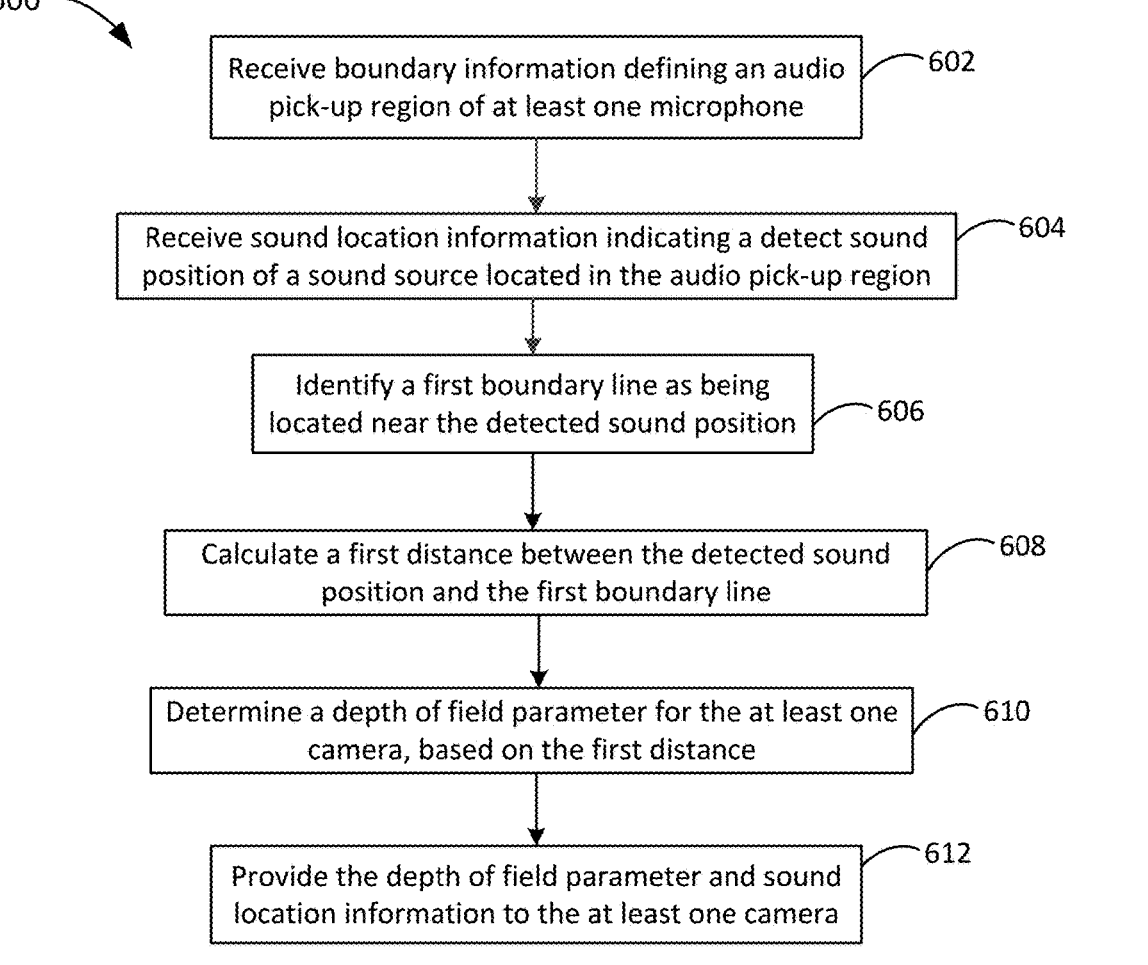
FIG. 6 is a flowchart illustrating exemplary operations for focusing image capture on a select audio source using an audio-visual system, in accordance with one or more embodiments.

Referring now to FIG. 6, shown is an exemplary method or process 600 comprising operations for focusing image capture on a select audio source using an audio-visual system, in accordance with embodiments. The process 600 may be implemented using at least one processor in communication with at least one microphone and at least one camera, or otherwise using an audio-visual system. For ease of explanation, the process 600 will be described below with reference to the audio-visual system 500 of FIG. 5, including the at least one microphone 502*a* . . . 502*n*, the at least one camera 504*a* . . . 504*n*, and/or the controller 506, though it should be appreciated that the process 600 may also be implemented using other audio-visual systems, processors, or devices. In embodiments, one or more processors and/or other processing components within the audio-visual system 500 may perform any, some, or all of the steps of process 600. For example, the process 600 may be implemented entirely or at least in part by the controller 506. In some embodiments, the process 600 may be carried out by a computing device included in the audio-visual system, or more specifically a processor of said computing device executing software stored in a memory. In some cases, the computing device may further carry out the operations of process 600 by interacting or interfacing with one or more other devices that are internal or external to the audio-visual system 500 and communicatively coupled to the computing device. One or more other types of components (e.g., memory, input and/or output devices, transmitters, receivers, buffers, drivers, discrete components, etc.) may also be utilized in conjunction with the processors and/or other processing components to perform any, some, or all of the steps of process 600.

As shown in FIG. 6, the process 600 may begin at step 602 with receiving, from the at least one microphone, boundary information defining a plurality of boundary lines for an audio pick-up region (such as, e.g., boundary lines 118 of audio coverage area 108 in FIG. 1). In some embodiments, the process 600 also comprises determining, based on the boundary information, an image field parameter for the at least one camera, and providing the image field parameter to the at least one camera. The image field parameter can be configured to define an image field of the at least one camera such that the image field comprises the audio pick-up region.

In some embodiments, the process 600 further comprises receiving, from the at least one camera, camera location information indicating a position of the at least one camera. In such cases, determining the image field parameter may comprise determining the image field parameter based further on the camera location information, and identifying the first boundary line may comprise identifying the first boundary line based further on the camera location information.

In some embodiments, the process 600 further comprises causing the at least one camera to apply an image enhancement to a portion of the image field that extends beyond the first boundary line to outside the audio pick-up region. The image enhancement may be a select image displayed over the portion of the image field, a blurring effect applied to the portion of the image field, or any other visual effect that covers or obscures the portion of the image field that extends beyond the audio pick-up region.

At step 604, the process 600 includes receiving, from the at least one microphone, sound location information indicating a detected sound position (e.g., position s in FIG. 1) of an audio source (e.g., audio source 106 in FIG. 1) located within the audio pick-up region. At step 606, the process 600 includes identifying, based on the sound location information and the boundary information, a first boundary line (e.g., line 118*a* of FIG. 1) of the plurality of boundary lines as being located near the detected sound position. At step 608, the process 600 includes calculating a first distance (e.g., distance d in FIG. 1) between the detected sound position and the first boundary line.

At step 610, the process 600 includes determining, based on the first distance, a depth of field parameter for the at least one camera. According to embodiments, the depth of field parameter adjusts a zone of focus of the at least one camera so that the zone of focus includes the audio source and a first area (e.g., area 120 in FIG. 1) between the audio source and the first boundary line, and excludes a second area (e.g., area 122 in FIG. 1) outside the audio pick-up region. At step 612, the process 600 includes providing the depth of field parameter and the sound location information to the at least one camera. The process 600 may end once step 612 is complete and/or a video output has been generated accordingly by the at least one camera.

In other embodiments, the process 600 may be adapted to accommodate multiple cameras and/or multiple microphones in accordance with one or more use cases or environments described herein. For example, in some cases, the process or method may be performed by one or more processors in communication with a first camera (e.g., camera 204 in FIG. 2), a second camera (e.g., camera 205 in FIG. 2), and at least one microphone (e.g., microphone 202 in FIG. 2). Such process may comprise, e.g., at step 602, receiving, from the at least one microphone, boundary information defining one or more first boundaries or boundary lines for a first audio pick-up region (e.g., the one or more first boundaries 218 of audio coverage area 208 in FIG. 2), and one or more second boundaries or boundary lines for a second audio pick-up region (e.g., the one or more second boundary lines 219 of audio coverage area 209 in FIG. 2). The process may also comprise, e.g., at step 604, receiving, from the at least one microphone, sound location information indicating: a first detected sound position (e.g., position s/in FIG. 2) of a first audio source (e.g., audio source 206 in FIG. 2) located within the first audio pick-up region, and a second detected sound position (e.g., position s2 in FIG. 2) of a second audio source (e.g., audio source 207 in FIG. 2) located within the second audio pick-up region. In addition, the process may also comprise identifying, based on the boundary information, the first camera as being near the first audio pick-up region and the second camera as being near the second audio pick-up region, and configuring the first camera to capture images of the first audio pick-up region, and the second camera to capture images of the second audio pick-up region. The process may further comprise, e.g., at step 606, identifying, based on the sound location information and the boundary information, a first boundary or boundary line (e.g., first boundary 218*a* of FIG. 2) of the one or more first boundaries as being located near the first detected sound position, and a second boundary or boundary line (e.g., line 219*a* of FIG. 2) of the one or more second boundaries as being located near the second detected sound position. Also, the process may comprise, e.g., at step 608, calculating a first distance (e.g., distance d1 in FIG. 2) between the first detected sound position and the first boundary line, and a second distance (e.g., distance d2 in FIG. 2) between the second detected sound position and the second boundary line. The process may further comprise, e.g., at step 610, determining, based on the first distance, a first depth of field parameter for the first camera, and determining, based on the second distance, a second depth of field parameter for the second camera. In addition, the process may comprise, e.g., at step 612, providing the first detected sound position and the first depth of field parameter to the first camera, and providing the second detected sound position and the second depth of field parameter to the second camera. The process may end there and/or once a video output has been generated accordingly by each of the cameras.

In other embodiments, a similar outcome may be obtained using a single, high fidelity camera, instead of two separate cameras. For example, the process 600 may be performed using a single camera and a controller configured to fragment imagery captured by the single camera into multiple videos or images. The multiple videos or images may respectively correspond to the plurality of audio pick-up regions, and the controller may be configured to adjust a focus parameter for each fragment depending on the sound location information and boundary information, using the techniques described herein.

Thus, the techniques described herein can be used to define a video fence for focusing a camera on a given audio source and excluding select areas from the captured imagery. The video fence may be created based on "talker tracking information" or outputs from a microphone that indicate a detected position of sound generated by the audio source (e.g., an active talker), as well as boundary information for an audio coverage area (or audio pick-up region) used by the microphone to capture the detected sound. For example, in some cases, the boundary information and the talker location information may be used to determine how much of the audio coverage area is remaining behind the active talker and adjust a depth of field parameter of the camera accordingly, so that a zone of focus for the camera only includes the audio source and the surrounding audio coverage area. In this manner, the video fence can be used to prevent areas outside the audio coverage area from being included within the images and/or video captured by the camera, thereby excluding any persons, objects, or scenery that are not intended or necessary for the output video. By using talker tracking information to configure the video fence, the techniques described herein can be used to provide intelligent event spaces that are flexible and configurable for both audio and video setup, no matter how diverse the configuration.

Referring back to FIG. 5, in various embodiments, the audio-visual system 500 may also include various components that are not shown in FIG. 5, such as, for example, one or more loudspeakers, display screens, computing devices, and/or cameras. In addition, one or more of the components in the system 500 may include one or more digital signal processors or other processing components, controllers, wireless receivers, wireless transceivers, etc., though not shown or mentioned above.

One or more components of the system 500 may be in wired or wireless communication with one or more other components of the system 500. For example, the at least one microphone 502a, . . . 502n and the at least one camera 504a, . . . 504n may be connected or coupled to the controller 506 via a wired connection (e.g., Ethernet cable, USB cable, etc.) or a wireless network connection (e.g., WiFi, Bluetooth, Near Field Communication ("NFC"), RFID, infrared, etc.). In some cases, the at least one microphone 502a, . . . 502n may include a network audio device coupled to the controller 506 via a network cable (e.g., Ethernet) and configured to handle digital audio signals. In other cases, the at least one microphone 502a, . . . 502n may include an analog audio device or another type of digital audio device and may be connected to the controller 506 using a Universal Serial Bus (USB) cable or other suitable connection mechanism. In some embodiments, one or more components of the system 500 may communicate with one or more other components of the system 500 via a suitable application programming interface (API).

In some embodiments, one or more components of the audio-visual system 500 may be combined into, or reside in, a single unit or device. For example, all of the components of the audio-visual system 500 may be included in the same device, such as one of the at least one microphone 502a, . . . 502n, one of the at least one camera 504a, . . . 504n, or a computing device comprising all of the same. As another example, the controller 506 may be included in, or combined with, any one of the microphone(s) 502a, . . . 502n or any one of the camera(s) 504a, . . . 504n. In some embodiments, the system 500 may take the form of a cloud based system or other distributed system, such that the components of the system 500 may or may not be physically located in proximity to each other.

The components of the system 500 may be implemented in hardware (e.g., discrete logic circuits, application specific integrated circuits (ASIC), programmable gate arrays (PGA), field programmable gate arrays (FPGA), digital signal processors (DSP), microprocessor, etc.), using software executable by one or more servers or computers, or other computing device having a processor and memory (e.g., a personal computer (PC), a laptop, a tablet, a mobile device, a smart device, thin client, etc.), or through a combination of both hardware and software. For example, some or all components of the at least one microphone 502a, . . . 502n, the at least one camera 504a, . . . 504n, and/or the controller 506 may be implemented using discrete circuitry devices and/or using one or more processors (e.g., audio processor and/or digital signal processor) executing program code stored in a memory (not shown), the program code being configured to carry out one or more processes or operations described herein, such as, for example, method or process 600 shown in FIG. 6. Thus, in embodiments, one or more of the components of the audio-visual system 500 may include one or more processors, memory devices, computing devices, and/or other hardware components not shown in the figures.

All or portions of the processes described herein, including method 600 of FIG. 6, may be performed by one or more processing devices or processors (e.g., analog to digital converters, encryption chips, etc.) that are within or external to the audio-visual system 500 of FIG. 5. In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the method 600. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

Any of the processors described herein may include a general purpose processor (e.g., a microprocessor) and/or a special purpose processor (e.g., an audio processor, a digital signal processor, etc.). In some examples, the processor(s) described herein may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Any of the memories or memory devices described herein may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory described herein includes multiple kinds of memory, particularly volatile memory and non-volatile memory.

Moreover, any of the memories described herein may be computer readable media on which one or more sets of instructions can be embedded. The instructions may reside completely, or at least partially, within any one or more of the memory, the computer readable medium, and/or within one or more processors during execution of the instructions. In some embodiments, the memory described herein may include one or more data storage devices configured for implementation of a persistent storage for data that needs to be stored and recalled by the end user. In such cases, the data storage device(s) may save data in flash memory or other memory devices. In some embodiments, the data storage device(s) can be implemented using, for example, SQLite data base, UnQLite, Berkeley DB, BangDB, or the like.

Any of the computing devices described herein can be any generic computing device comprising at least one processor and a memory device. In some embodiments, the computing device may be a standalone computing device included in the audio-visual system 500, or may reside in another component of the system 500, such as, e.g., any one of the microphone(s) 502a, . . . 502n, any one of the camera(s) 504a, . . . 504n, and/or the controller 506. In such embodiments, the computing device may be physically located in and/or dedicated to the given environment or room, such as, e.g., the same environment in which the microphone(s) 502a, . . . 502n and camera(s) 504a, . . . 504n are located. In other embodiments, the computing device may not be physically located in proximity to the microphone(s) 502a, . . . 502n and camera(s) 504a, . . . 504n but may reside in an external network, such as a cloud computing network, or may be otherwise distributed in a cloud-based environment. Moreover, in some embodiments, the computing device may be implemented with firmware or completely software-based as part of a network, which may be accessed or otherwise communicated with via another device, including other computing devices, such as, e.g., desktops, laptops, mobile devices, tablets, smart devices, etc. Thus, the term "computing device" should be understood to include distributed systems and devices (such as those based on the cloud), as well as software, firmware, and other components configured to carry out one or more of the functions described herein. Further, one or more features of the computing device may be physically remote and may be communicatively coupled to the computing device.

In some embodiments, any of the computing devices described herein may include one or more components configured to facilitate a conference call, meeting, classroom, or other event and/or process audio signals associated therewith to improve an audio quality of the event. For example, in various embodiments, any computing device described herein may comprise a digital signal processor ("DSP") configured to process the audio signals received from the various microphones or other audio sources using, for example, automatic mixing, matrix mixing, delay, compressor, parametric equalizer ("PEQ") functionalities, acoustic echo cancellation, and more. In other embodiments, the DSP may be a standalone device operatively coupled or connected to the computing device using a wired or wireless connection. One exemplary embodiment of the DSP, when implemented in hardware, is the P300 IntelliMix Audio Conferencing Processor from SHURE, the user manual for which is incorporated by reference in its entirety herein. As further explained in the P300 manual, this audio conferencing processor includes algorithms optimized for audio/video conferencing applications and for providing a high quality audio experience, including eight channels of acoustic echo cancellation, noise reduction and automatic gain control. Another exemplary embodiment of the DSP, when implemented in software, is the IntelliMix Room from SHURE, the user guide for which is incorporated by reference in its entirety herein. As further explained in the IntelliMix Room user guide, this DSP software is configured to optimize the performance of networked microphones with audio and video conferencing software and is designed to run on the same computer as the conferencing software. In other embodiments, other types of audio processors, digital signal processors, and/or DSP software components may be used to carry out one or more of the audio processing techniques described herein, as will be appreciated.

Moreover, any of the computing devices described herein may also comprise various other software modules or applications (not shown) configured to facilitate and/or control the conferencing event, such as, for example, internal or proprietary conferencing software and/or third-party conferencing software (e.g., Microsoft Skype, Microsoft Teams, Bluejeans, Cisco WebEx, GoToMeeting, Zoom, Join.me, etc.). Such software applications may be stored in the memory of the computing device and/or may be stored on a remote server (e.g., on premises or as part of a cloud computing network) and accessed by the computing device via a network connection. Some software applications may be configured as a distributed cloud-based software with one or more portions of the application residing in the computing device and one or more other portions residing in a cloud computing network. One or more of the software applications may reside in an external network, such as a cloud computing network. In some embodiments, access to one or more of the software applications may be via a web-portal architecture, or otherwise provided as Software as a Service (SaaS).

In general, a computer program product in accordance with embodiments described herein includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others). In some embodiments, the program code may be a computer program stored on a non-transitory computer readable medium that is executable by a processor of the relevant device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding, or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in the figures, such as, e.g., FIG. 6, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as is known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. The above description is intended to be taken as a whole and interpreted in accordance with the principles taught herein and understood to one of ordinary skill in the art.

In this disclosure, the use of the disjunctive is intended to include the conjunctive. The use of definite or indefinite articles is not intended to indicate cardinality. In particular, a reference to "the" object or "a" and "an" object is intended to also denote one of a possible plurality of such objects.

This disclosure describes, illustrates, and exemplifies one or more particular embodiments of the invention in accordance with its principles. The disclosure is intended to explain how to fashion and use various embodiments in accordance with the technology rather than to limit the true, intended, and fair scope and spirit thereof. That is, the foregoing description is not intended to be exhaustive or to be limited to the precise forms disclosed herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The embodiment(s) provided herein were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally, and equitably entitled.

What is claimed is:

1. A method performed by one or more processors in communication with each of at least one microphone and at least one camera, the method comprising:

receiving, from the at least one microphone, boundary information defining one or more boundaries for an audio pick-up region;

receiving, from the at least one microphone, sound location information indicating a detected sound position of an audio source located within the audio pick-up region;

identifying, based on the sound location information and the boundary information, a first boundary of the one or more boundaries as being located near the detected sound position;

calculating a first distance between the detected sound position and the first boundary;

determining, based on the first distance, a depth of field parameter for the at least one camera, wherein the depth of field parameter is configured so that a zone of focus of the at least one camera excludes areas outside the audio pick-up region from appearing in focus; and providing the depth of field parameter and the sound location information to the at least one camera.

2. The method of claim 1, wherein the depth of field parameter adjusts a zone of focus of the at least one camera so that the zone of focus includes the audio source and a first area between the audio source and the first boundary, and excludes a second area outside the audio pick-up region.

3. The method of claim 1, further comprising:

determining, based on the boundary information, an image field parameter for the at least one camera; and providing the image field parameter to the at least one camera, wherein the image field parameter is configured to define an image field of the at least one camera such that the image field comprises the audio pick-up region.

4. The method of claim 3, further comprising:

causing the at least one camera to apply an image enhancement to a portion of the image field that extends beyond the first boundary to outside the audio pick-up region.

5. The method of claim 4, wherein the image enhancement is a select image displayed over the portion of the image field.

6. The method of claim 4, wherein the image enhancement is a blurring effect applied to the portion of the image field.

7. The method of claim 3, further comprising:

receiving, from the at least one camera, camera location information indicating a position of the at least one camera, wherein determining the image field parameter comprises determining the image field parameter based further on the camera location information, and identifying the first boundary comprises identifying the first boundary based further on the camera location information.

8. The method of claim 1, wherein the at least one microphone is housed in a separate housing from the at least one camera.

9. A system comprising:

at least one microphone configured to provide: boundary information defining one or more boundaries for an audio pick-up region, and sound location information indicating a detected sound position of an audio source located within the audio pick-up region;

at least one camera configured to capture images or video of the audio pick-up region; and one or more processors communicatively coupled to each of the at least one microphone and the at least one camera, the one or more processors configured to:

receive the boundary information and the sound location information from the at least one microphone;

identify, based on the sound location information and the boundary information, a first boundary, of the one or more boundaries, that is located near the detected sound position;

calculate a first distance between the detected sound position and the first boundary;

determine, based on the first distance, a depth of field parameter for the at least one camera, wherein the depth of field parameter is configured so that a zone of focus of the at least one camera excludes areas outside the audio pick-up region from appearing in focus; and provide the depth of field parameter and the sound location information to the at least one camera.

10. The system of claim 9, wherein the at least one camera is further configured to, based on the depth of field parameter, adjust a zone of focus of the at least one camera such that the zone of focus includes the audio source and a first area between the audio source and the first boundary, and excludes a second area outside the audio pick-up region.

11. The system of claim 9, wherein the at least one camera is configured to capture the images or video of the audio pick-up region based on an image field parameter configured to define an image field of the at least one camera to include the audio pick-up region, and wherein the one or more processors are further configured to determine the image field parameter based on the boundary information, and provide the image field parameter to the at least one camera.

12. The system of claim 11, wherein the at least one camera is configured to apply an image enhancement to a portion of the image field that extends beyond the first boundary to outside the audio pick-up region.

13. The system of claim 12, wherein the image enhancement is a select image displayed over the portion of the image field.

14. The system of claim 12, wherein the image enhancement is a blurring effect applied to the portion of the image field.

15. The system of claim 11, wherein the at least one camera is further configured to provide, to the one or more processors, camera location information indicating a position of the at least one camera, and the one or more processors are configured to: determine the image field parameter based further on the camera location information, and identify the first boundary based further on the camera location information.

16. The system of claim 9, further comprising a second camera, wherein the boundary information further defines a second audio pick-up region for one or more second boundaries, the sound location information further indicates a second detected sound position of a second audio source located within the second audio pick-up region, and the one or more processors are further configured to:

identify, based on the boundary information, the second camera as being near the second audio pick-up region;

configure the second camera to capture images or video of the second audio pick-up region;

identify, based on the sound location information and the boundary information, a second boundary of the one or more second boundaries as being located near the second detected sound position;

calculate a second distance between the second detected sound position and the second boundary;

determine, based on the second distance, a second depth of field parameter for the second camera; and provide the second detected sound position and the second depth of field parameter to the second camera.

17. A method performed by one or more processors in communication with: a first camera, a second camera, and at least one microphone, the method comprising:

receiving, from the at least one microphone, boundary information defining one or more first boundaries for a first audio pick-up region, and one or more second boundaries for a second audio pick-up region;

receiving, from the at least one microphone, sound location information indicating: a first detected sound position of a first audio source located within the first audio pick-up region, and a second detected sound position of a second audio source located within the second audio pick-up region;

identifying, based on the boundary information, the first camera as being near the first audio pick-up region and the second camera as being near the second audio pick-up region;

configuring the first camera to capture images or video of the first audio pick-up region, and the second camera to capture images or video of the second audio pick-up region;

identifying, based on the sound location information and the boundary information, a first boundary of the one or more first boundaries as being located near the first detected sound position, and a second boundary of the one or more second boundaries as being located near the second detected sound position;

calculating a first distance between the first detected sound position and the first boundary, and a second distance between the second detected sound position and the second boundary;

determining, based on the first distance, a first depth of field parameter for the first camera;

determining, based on the second distance, a second depth of field parameter for the second camera, wherein one or more of the first depth of field parameter or second depth of field parameter is configured so that a zone of focus of one or more of the first camera or the second camera excludes areas outside the first audio pick-up region or second audio pick-up region from appearing in focus;

providing the first detected sound position and the first depth of field parameter to the first camera; and providing the second detected sound position and the second depth of field parameter to the second camera.

18. The method of claim 17, wherein the first depth of field parameter adjusts a first zone of focus of the first camera so that the first zone of focus includes the first audio source and a first area between the first audio source and the first boundary, and excludes a second area outside the first audio pick-up region, and wherein the second depth of field parameter adjusts a second zone of focus of the second camera so that the second zone of focus includes the second audio source and a third area between the second audio source and the second boundary, and excludes a fourth area outside the second audio pick-up region.

19. The method of claim 17, further comprising:

determining, based on the boundary information, a first image field parameter for the first camera;

providing the first image field parameter to the first camera;

determining, based on the boundary information, a second image field parameter for the second camera; and providing the second image field parameter to the second camera, wherein the first image field parameter is configured to define a first image field of the first camera such that the first image field comprises the first audio pick-up region, and wherein the second image field parameter is configured to define a second image field of the second camera such that the second image field comprises the second audio pick-up region.

20. The method of claim 19, further comprising:

causing the first camera to apply a first image enhancement to a first portion of the first image field that extends beyond the first boundary to outside the first audio pick-up region, and causing the second camera to apply a second image enhancement to a second portion of the second image field that extends beyond the second boundary to outside the second audio pick-up region.

21. The method of claim 19, further comprising:

receiving, from the first camera, a first camera location information indicating a first position of the first camera; and receiving, from the second camera, a second camera location information indicating a second position of the second camera, wherein determining the first image field parameter comprises determining the first image field parameter based further on the first camera location information, and identifying the first boundary comprises identifying the first boundary based further on the first camera location information, and wherein determining the second image field parameter comprises determining the second image field parameter based further on the second camera location information, and identifying the second boundary comprises identifying the second boundary based further on the second camera location information.

* * * * *